US008864375B2

(12) United States Patent
Abe et al.

(10) Patent No.: US 8,864,375 B2
(45) Date of Patent: Oct. 21, 2014

(54) TEMPERATURE SENSOR

(75) Inventors: Nobuo Abe, Yokkaichi (JP); Tsunenobu Hori, Kariya (JP); Masatoshi Kuroyanagi, Kariya (JP)

(73) Assignee: Denso Corporation, Kariya (JP)

( * ) Notice: Subject to any disclaimer, the term of this patent is extended or adjusted under 35 U.S.C. 154(b) by 935 days.

(21) Appl. No.: 12/525,146

(22) PCT Filed: Jan. 31, 2008

(86) PCT No.: PCT/JP2008/051478
§ 371 (c)(1),
(2), (4) Date: Nov. 2, 2009

(87) PCT Pub. No.: WO2008/093766
PCT Pub. Date: Aug. 7, 2008

(65) Prior Publication Data
US 2010/0054301 A1   Mar. 4, 2010

(30) Foreign Application Priority Data

Jan. 31, 2007 (JP) ................. 2007-021834
Apr. 13, 2007 (JP) ................. 2007-106162
Jan. 29, 2008 (JP) ................. 2008-017956

(51) Int. Cl.
*G01K 1/08* (2006.01)
*G01K 1/14* (2006.01)
*G01K 13/02* (2006.01)

(52) U.S. Cl.
CPC *G01K 13/02* (2013.01); *G01K 1/08* (2013.01); *G01K 2205/04* (2013.01)
USPC ............ 374/163; 374/208; 374/144; 374/185

(58) Field of Classification Search
USPC ......... 374/100, 141, 142, 144, 147, 148, 163, 374/183, 185, 208, 158, 179; 136/200
See application file for complete search history.

(56) References Cited

U.S. PATENT DOCUMENTS 2,820,840 A * 1/1958 Anderson et al. ............. 136/231
5,366,290 A * 11/1994 Mayer et al. .................. 374/130
(Continued)

FOREIGN PATENT DOCUMENTS

CN   2114823   9/1992
JP   5-79922   3/1993
(Continued)

OTHER PUBLICATIONS

Translation of the International Preliminary Report on Patentability for PCT/JP2008/051478, mailed Aug. 13, 2009.
(Continued)

*Primary Examiner* — Gail Kaplan Verbitsky
(74) *Attorney, Agent, or Firm* — Nixon & Vanderhye P.C.

(57) ABSTRACT

The temperature sensor 1 is equipped with a temperature sensitive device 2 to be disposed inside an exhaust pipe of an internal combustion engine, signal lines 31 connected at a top end side to the temperature sensitive device 2 and at a rear end side to leads for connection with an external circuit, an inner member 18 having a sheath pin 3 in which the signal lines 31 are disposed, and an outer member 13 disposed to cover at least a portion of an outer periphery of the inner member 18. The outer member 13 includes a fixed portion (rib 6) to be fixed to an upper wall of the exhaust pipe, a retainer portion 132 retaining the inner member 18, and an extending portion 131 formed closer to a top end side than the retainer portion 132. The extending portion 131 includes a clearance portion 19 disposed so as to have an air gap between itself and the inner member 18 and a front interference portion 133 disposed in a condition that a maximum air gap between the front interference portion 133 and the inner member 18 in a radius direction is 0.2 mm or less.

21 Claims, 25 Drawing Sheets

(56) References Cited

U.S. PATENT DOCUMENTS

| | | | |
|---|---|---|---|
| 6,286,995 B1* | 9/2001 | Takahashi et al. | 374/148 |
| 6,466,123 B1* | 10/2002 | Kuzuoka et al. | 338/25 |
| 6,639,505 B2* | 10/2003 | Murata et al. | 338/25 |
| 6,698,922 B2* | 3/2004 | Adachi et al. | 374/208 |
| 6,776,524 B2* | 8/2004 | Park et al. | 374/179 |
| 6,899,457 B2* | 5/2005 | Kurano | 374/185 |
| 6,997,607 B2* | 2/2006 | Iwaya et al. | 374/208 |
| 7,458,718 B2* | 12/2008 | Krishnamurthy et al. | 374/208 |
| 7,507,024 B2* | 3/2009 | Takahashi | 374/185 |
| 7,553,078 B2* | 6/2009 | Hanzawa et al. | 374/185 |
| 7,740,403 B2* | 6/2010 | Irrgang et al. | 374/185 |
| 7,748,898 B2* | 7/2010 | Toudou et al. | 374/208 |
| 2006/0176931 A1 | 8/2006 | Miyahara et al. | |
| 2007/0258506 A1* | 11/2007 | Schwagerman et al. | 374/179 |
| 2008/0205485 A1* | 8/2008 | Takahashi | 374/208 |

FOREIGN PATENT DOCUMENTS

| | | |
|---|---|---|
| JP | 2000-162051 | 6/2000 |
| JP | 2002-350237 | 12/2002 |
| JP | 2002-350239 | 12/2002 |
| JP | 2004-177182 | 6/2004 |
| JP | 2004-286490 | 10/2004 |
| JP | 2006-047273 | 2/2006 |
| JP | 3826098 | 7/2006 |

OTHER PUBLICATIONS

International Search Report for PCT/JP2008/051478 mailed May 13, 2008.

Chinese Office Action dated Aug. 12, 2010 issued in corresponding Chinese Application No. 200880003841.0 with English Translation.

* cited by examiner

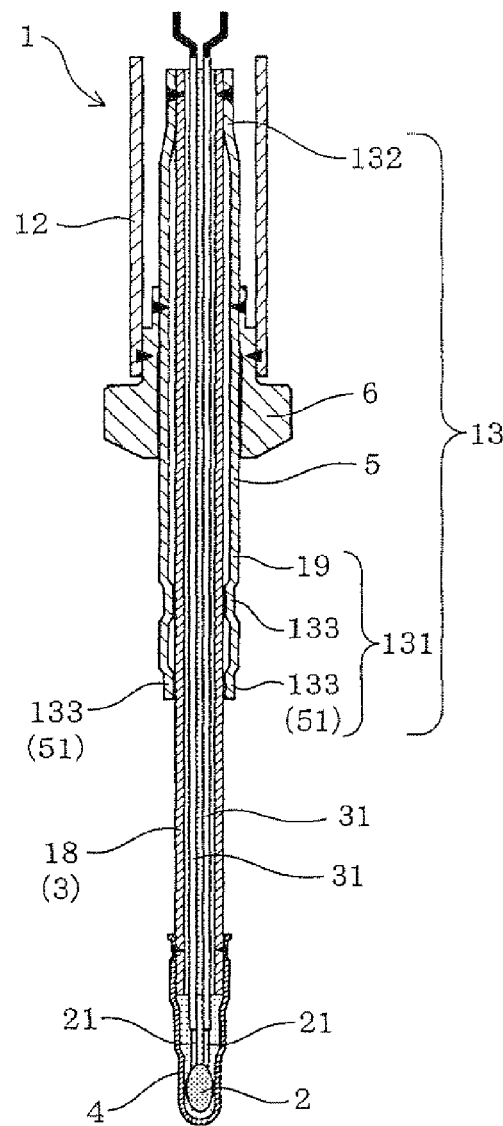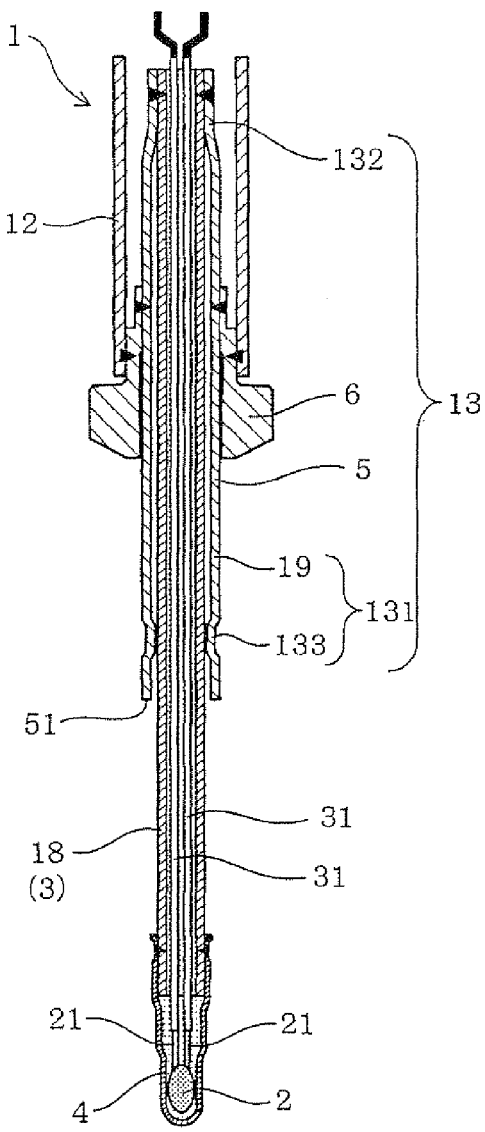

TEMPERATURE SENSOR

This application is the U.S. national phase of International Application No. PCT/JP2008/051478 filed 31 Jan. 2008 which designated the U.S. and claims priority to Japanese Patent Application Nos. 2007-021834 filed 31 Jan. 2007, 2007-106162 filed 13 Apr. 2007 and 2008-017956 filed 29 Jan. 2008, the entire contents of each of which are hereby incorporated by reference.

TECHNICAL FIELD

The present invention relates to a temperature sensor which is to be installed in an exhaust system of an internal combustion engine.

BACKGROUND ART

There is a temperature sensor 9 which, as illustrated in FIG. 30, includes a temperature sensitive device 2, a sheath pin 3 in which a pair of signal lines 31 leading to the temperature sensitive device 2 are disposed, a metal cover 4 fit on the top to cover the temperature sensitive device 2, and a rib 6 retaining the outer periphery of the sheath pin 3 (Patent Document 1). In the temperature sensor 9, the sheath pin 3 and the rib 6 are welded together.

In the case where the temperature sensor 9 is, as illustrated in FIG. 31, mounted in the exhaust system of an internal combustion engine, a temperature sensitive portion 96 in which the temperature sensitive device 2 is disposed is inserted into the exhaust pipe 80. The rib 6 is placed in contacting abutment with a top surface 811 of a boss 81 provided on the exhaust pipe 80.

The internal combustion engine in which the temperature sensor 9 is mounted in the above manner vibrates during running, so that vibrations are transmitted from the exhaust pipe 80 to the boss 81, to the rib 6, and to the sheath pin 9 of the temperature sensor 9. The rib 6 and the sheath pin 3 is welded together, so that the vibrations are transmitted from the rib 6 directly to the sheath pin 3.

The vibrations of the sheath pin 3 will, therefore, be strong vibrations (high frequency and amplitude), which may cause the temperature sensitive portion 96 to vibrate at a high acceleration level.

As a result, an excessive degree of stress may be exerted on the top end portion of the sheath pin 3, the temperature sensitive device 2 provided on the top end portion, or the joint between the sheath pin 3 and the rib 6.

The exertion of the stress on the temperature sensitive device 2 may result in breakage thereof or disconnection of the electrode 21 of the temperature sensitive device 2.

The excessive exertion of the stress on the joint between the sheath pin 3 and the rib 6 may result in cracks in or breakage of the weld or the sheath pin 3.

There is disclosed a structure in which a guard member is disposed on the outer periphery of the sheath pin, and a damper made of an elastic material is interposed between the guard member and the sheath pin in order to dampen the vibrations of the sheath pin (Patent Document 2).

Patent Document 3 discloses the structure in which a capsule portion is provided on the outer periphery of the sheath pin. The capsule portion is, however, fixed to the outer periphery of the sheath pin through clamping.

Patent Document 1: Patent Publication No. 2000-162051
Patent Document 2: U.S. Pat. No. 4,525,081
Patent Document 3: U.S. Pat. No. 3,826,098

DISCLOSURE OF THE INVENTION

Problem to be Solved by the Invention

In the case of the structure, as shown in Patent Document 2, the damper that is the elastic body is disposed around the sheath pin to dampen the vibrations of the sheath pin, so that the vibrations of the sheath pin itself can be dampened. It is, however, impossible to attenuate the vibrations of the temperature sensitive device installed through the signal lines and electrodes on the top end side of the sheath pin. Rather, it may increase the vibrations of the temperature sensitive device. This is because the sheath pin and the temperature sensitive device installed on the top end side thereof are different in resonance point. Specifically, in this damping structure, it is possible to dampen the vibrations at the resonance point of the sheath pin, but however, it is impossible to suppress the vibrational energy produced by the vibrations of the temperature sensitive device. This conversely results in an increase in vibration of the temperature sensitive device which has the resonance point on the high-frequency side. It is, thus, difficult to avoid the wire breakage of the signal lines and the electrodes.

In the temperature sensor which is to be disposed in the exhaust pipe which will be exposed to extremely high temperatures, the installation of a damper made of elastic material such as resin is not realistic in terms of the heat-resistance.

In the structure, as shown in Patent Document 3, the capsule portion is clamped and fixed to the outer periphery of the sheath pin, thus causing the vibrations to be transmitted to the sheath pin, so that the top end side from a location of fixation to the capsule portion vibrates. It is, thus, impossible to suppress the vibrations sufficiently.

The present invention was made in view of the above problem and is to provide a temperature sensor which suppresses the transmission of vibrations and is excellent in durability.

Means for Solving Problem

The invention is a temperature sensor equipped with a temperature sensitive device to be disposed inside an exhaust pipe of an internal combustion engine, signal lines connected at a top end side to the temperature sensitive device and at a rear end side to leads for connection with an external circuit, an inner member having a sheath pin in which the signal lines are disposed, and an outer member disposed to cover at least a portion of an outer periphery of the inner member, characterized in that said outer member includes a fixed portion to be fixed to an upper wall of the exhaust pipe, a retainer portion retaining said inner member, and an extending portion formed closer to a top end side than the retainer portion, and the extending portion includes a clearance portion disposed so as to have an air gap between itself and said inner member and a front interference portion disposed in a condition that a maximum air gap between the front interference portion and the inner member in a radius direction is 0.2 mm or less (claim 1).

Next, the operation and effects of the invention will be described.

In the above temperature sensor, the outer member has the clearance portion on the extending portion. The clearance portion has the air gap between itself and the inner member. This avoids the transmission of vibration of the internal combustion engine directly to the inner member from the fixed portion to suppress the vibration of the inner member or the sheath pin.

When the vibration is transmitted to the inner member, so that it has started to vibrate, the front interference portion provided in the extending portion of the outer member can suppress the amplitude of the inner member, thereby preventing the amplitude of the inner member from increasing to decrease the acceleration acting on the top end of the inner member.

Unlike the attenuation structure of the patent document 2, as described above, the front interference portion is so designed as to be disposed to have the maximum air gap of 0.2 mm or less between itself and the inner member in the radius direction to avoid the vibration of the inner member through the interference. This enables vibrational energy itself to be decreased which cannot be decreased by the attenuation of the vibration through a damper, as shown in the patent document 2. It is, therefore, possible not only to suppress the characteristic vibration of the inner member, but also the vibration of the temperature sensitive device having a resonance point within a frequency band higher than that of the inner member.

Further, even when the inner member starts to resonate with the outer member at its characteristic frequency, the front interference portion works to interfere with the inner member to suppress the resonance.

When the characteristic frequencies of the inner member and the outer member are different, they interfere with each other to suppress the vibration of the inner member.

As a result, the acceleration acting on the temperature sensitive device lying on the front end side of the inner member is decreased to decrease the stress exerted on the temperature sensitive device. This avoids the breakage of the temperature sensitive device or disconnection of electrodes of the temperature sensitive device, thereby providing the temperature sensor which is excellent in durability thereof.

Additionally, the maximum air gap between the front interference portion and the inner member is 0.2 mm or less, thereby resulting in a great degree of suppression of the amplitude of the inner member through the front interference portion to prevent the acceleration of the top end of the inner member from increasing.

Specifically, the inner member vibrates like a cantilever fixed only by the retainer portion of the outer member. In this case, the number of vibrations (i.e., the frequency) is constant, so that the acceleration of the top end of the inner member depends upon the amplitude. The acceleration may, therefore, be decreased, as described above, by decreasing the amplitude of the inner member. This results in a decrease in stress acting on a portion of the temperature sensitive device on the top end side of the inner member.

As described above, the present invention provides a temperature sensor which suppresses the transmission of vibrations and is excellent in durability.

BRIEF DESCRIPTION OF THE DRAWINGS

FIG. 29(A) is a longitudinal sectional view of a temperature sensor in the fifteenth embodiment;

FIG. 29(B) is a longitudinal sectional view of a temperature sensor in the sixth embodiment;

Figure 1:
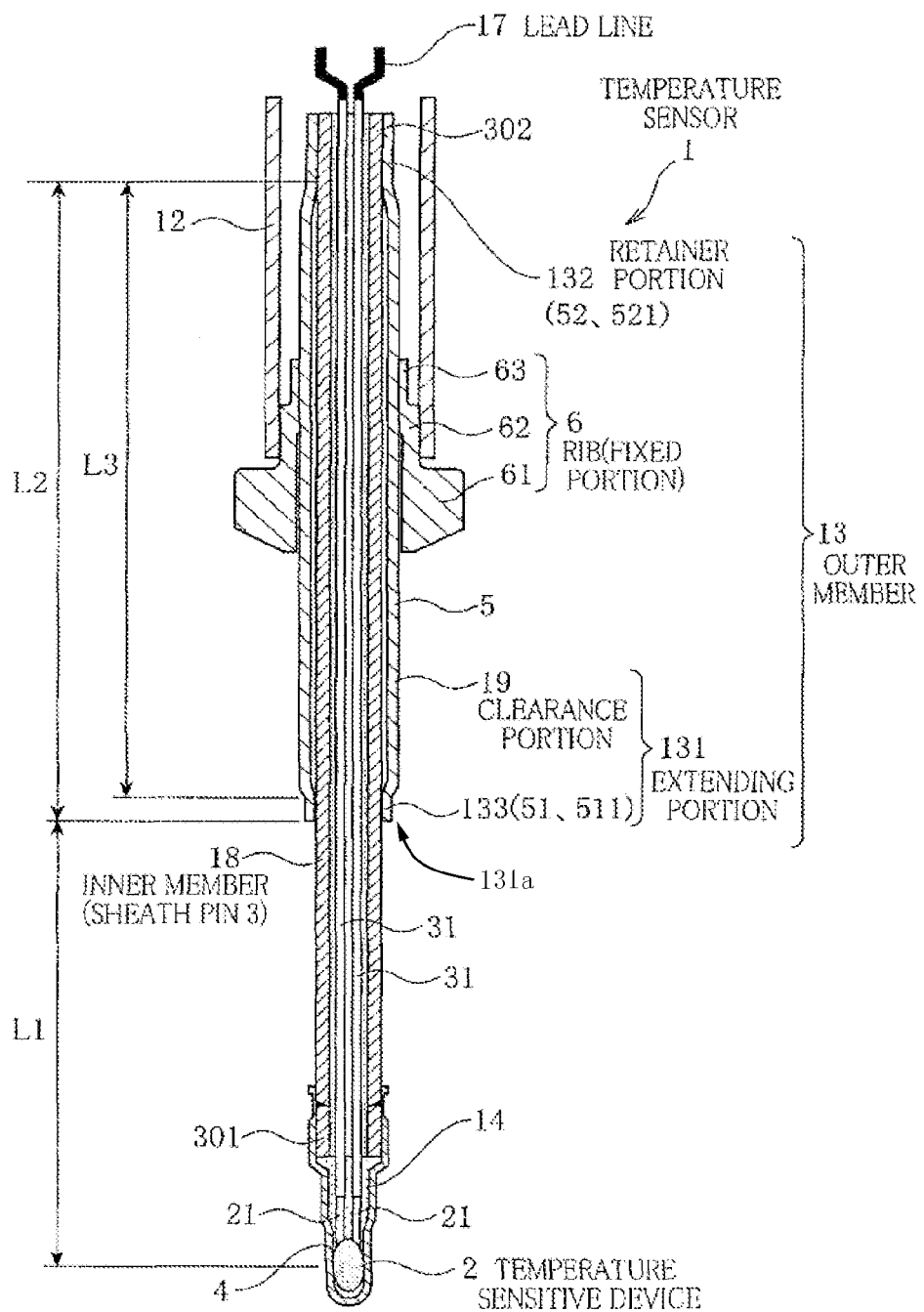
FIG. 1 is a longitudinal sectional view which shows a temperature sensor according to the first embodiment.

DESCRIPTION OF REFERENCE NUMBERS 1 temperature sensor
13 outer member 131 extending portion
132 holding portion
133 front interference portion
14 lead wire
18 inner member
19 clearance portion
2 temperature sensitive device
21 electrode
3 sheath pin
31 signal line
4 metallic cover
5 guard tube
51 top end
52 rear end
6 rib

BEST MODES OF THE INVENTION

In the present invention, the above described temperature sensor is used, for example, in measuring the temperature of an exhaust system etc., of an internal combustion engine and to be inserted into and disposed inside an exhaust pipe etc. in use.

In this specification, the side where the above described temperature sensor is inserted into the exhaust pipe etc., that is, where a temperature sensitive device is disposed will be referred to as a top end side, while the opposite side will be referred to as a rear end side.

In addition to the above described fixed portion, the above described retainer portion, and the above described extending portion, the outer member may include an additional member which vibrates at the same frequency as that of the fixed portion. The inner member may also include an additional member which resonates with, for example, the sheath pin.

If there is a clearance between the clearance portion and the inner member (in FIG. 4, S1>0), the effects are provided. The clearance is more preferably 0.2 mm or more (S1>0.2 mm).

The maximum air gap between the front interference portion and the inner member is 0.2 mm or less. The front interference portion may be in contact with the inner member partially. On this contacting portion, the vibration may be suppressed effectively. An non-contacting portion is set to have a maximum air gap of 0.2 mm or less between the front interference portion and the inner member. When the front interference potion is formed, pressing or drawing may be used for example.

The front interference portion may be in contact with an entire circumference of the inner member. In this case, the vibration transmitted to the inner member may also be suppressed. Specifically, when the front interference portion of the outer member is placed in contact with the inner member without being welded thereto, the vibration of the outer member transmitted to the inner member through the front interference portion is suppressed to reduce the vibration of the inner member. The size of the air gap between the front interference portion and the inner member is preferably as small as possible.

The front interference portion may have a parallel portion parallel to an outer peripheral surface of the inner member. This causes the front interference portion and the inner member to have portions which are to be placed in surface contact with each other. Even when the front interference portion and the inner member meet each other several times during the vibration, the wear of the front interference portion may be decreased. The parallel portion may be in parallel to the outer peripheral surface of the inner member to the extent that the front interference portion makes a surface contact with the inner member. The entire surface of the parallel portion may be in contact with the inner member.

The front interference portion may be formed as a part of the clearance portion.

As long as the front interference portion is located closer to the top end side than the retainer portion, it may be formed at a single place or each of a plurality of places.

The fixed portion is preferably made by the rib disposed on the outer periphery of the sheath pin.

In this case, it is possible to install the fixed portion to an outer wall of the exhaust pipe easily.

If an axial length between a top end of the extending portion and a center of said temperature sensitive device is defined as L1, an axial length between a top end of the retainer portion and the top end of the extending portion is defined as L2, and an axial length of the clearance portion is defined as L3, a relation of L3.gtoreq.0.3.times.(L1'L2) is preferably met.

In this case, it is possible to suppress the vibration of the inner member sufficiently by the front interference portion provided in the extending portion of the outer member. Specifically, when the front interference portion is placed at a location where the above relation is met, the front interference portion is placed at a distance away from the outer member as a fixed end and the retainer portion of the inner member. Specifically, the front interference portion is placed at a location where the amplitude of the inner member is easy to be great, thereby providing the effects that the front interference portion suppresses the amplitude of the inner member. Even when resonating, the front interference portion interferes with the inner member at an initial stage of the resonance to suppress the resonance.

When L3<0.3×(L1+L2), the outer member that is the fixed end, the retainer portion of the inner member, and the front interference portion are too close to achieve the effects that the front interference portion suppresses the vibration of the inner member.

The front interference portion may be so disposed that the maximum air gap between itself and the inner member in the radius direction is 0.08 mm or less.

In this case, it is possible to suppress the vibration of the inner member in a high frequency band such as a high order of a resonance point. Specifically, for example, when the maximum air gap between the front interference portion and the inner member in the radius direction is 0.2 mm or less, it is possible to have the front interference portion interferes with the inner member to suppress the vibration at the primary resonance point. However, it is preferable that the maximum air gap is 0.08 mm or less to achieve the effects of suppressing the vibration up to a high frequency band (e.g., 10 kHz).

The front interference portion is preferably placed at a location other than a node of vibration of the inner member within a frequency band of 10 kHz or less.

In this case, it is possible to suppress the vibration of the inner member effectively. Specifically, it is possible not only to suppress the primary resonance of the inner member, but also the secondary resonance or more arising from the vibration at a frequency of 10 kHz or less in the internal combustion engine. The reason why it is limited to a frequency of 10 kHz or less is because the vibration of a portion of the exhaust pipe of the vehicle to which the temperature sensor is installed is usually 10 kHz or less.

The outer retainer preferably includes a guard tube disposed so as to cover the outer periphery of the inner member. The extending portion is preferably made of a part of the guard tube.

In this case, the front interference portion is made by the guard tube that is a member separate from the rib, thus facilitating ease of machining the outer member and resulting in a decrease in production cost thereof. The structure which does not use the guard tube needs to machine the front interference portion along with the outer member, thus resulting in an increased difficulty of such machining.

The inner member is preferably retained by said fixed portion through the guard tube.

In this case, the vibration of the internal combustion engine is not transmitted directly to the fixed portion through the guard tube, thereby suppressing the vibration at the guard tube. This further suppress the vibration of the inner member.

The guard tube preferably has small-diameter portions which are formed at a top end and a rear end and are smaller in diameter than another portion thereof.

In this case, the small-diameter portions provided in the ends of the guard tube hold or guide the sheath pin. Specifically, the small-diameter portion on the rear end side serves as the retainer portion to retain the inner member, while the small-diameter portion on the top end side serves as the interference portion. A portion between the small-diameter portions serves as the clearance portion forming a clearance between itself and the inner member.

The portion between the small-diameter portions may be located away from the inner member. This causes the guard tube to work as a spring to attenuate the vibration of the fixed portion at the guard tube to suppress the vibration transmitted to the inner member.

The guard tube and the fixed portion are preferably welded at entire circumferences thereof.

In this case, the entry of exhaust gas, etc. into the temperature sensor from between the guard tube and the fixed portion is avoided.

The retainer portion is preferably formed at an axial location coinciding with a rear end portion of the fixed portion or closer to the rear end side than the rear end portion of the fixed portion.

In this case, it is possible to increase the length of the extending portion and the clearance portion, thus permitting the front interference portion to be located far away from the inner member that is the fixed end and the retainer portion of the outer member. This enhances the effects of suppressing the vibration of the inner member through the front interference portion.

A rear end portion of said outer member and the inner member are welded at entire circumferences thereof at the retainer portion.

In this case, the entry of exhaust gas, etc. which has entered between the outer member and the inner member into the temperature sensor is avoided.

The temperature sensor preferably has a metal cover formed so as to cover the temperature sensitive device.

In this case, it is possible to block the temperature sensitive device from an exhaust gas atmosphere, thereby avoiding reduction-caused deterioration of the temperature sensitive device.

A retaining member is preferably disposed between the temperature sensitive device and the metal cover to retain and fix the temperature sensitive device.

In this case, it is possible to avoid a hit of the temperature sensitive device against the metal cover when the temperature sensor vibrates, so that the temperature sensitive device swings. This avoid the breakage of the temperature sensitive device and disconnection of electrodes of the temperature sensitive device, thus providing the temperature sensor which is excellent in durability.

The use of material excellent in thermal conductivity as the fixed portion enables quick transmission of heat outside the metal cover to the temperature sensitive device, thereby providing the temperature sensor which is excellent in response rate.

The temperature sensor preferably includes a metal tube formed so as to cover the outer periphery of the sheath pin and the temperature sensitive device, the metal tube being disposed between the sheath pin and the fixed portion.

In this case, it is possible to block the temperature sensitive device from an exhaust gas atmosphere, thereby avoiding reduction-caused deterioration of the temperature sensitive device.

In this case, the metal tube forms a part of the inner member.

A retaining member is preferably disposed between the temperature sensitive device and the metal tube to retain and fix the temperature sensitive device.

In this case, it is possible to avoid the breakage of the temperature sensitive device and disconnection of electrodes of the temperature sensitive device, thus providing the temperature sensor which is excellent in durability.

The temperature sensitive device is preferably made of a thermistor.

In this case, it is possible to obtain the temperature sensor which is high in measurement accuracy.

At least a portion of the inner member and the outer member is preferably made of an oxidation resistance metallic material.

In this case, it is possible to obtain the temperature sensor which is excellent in durability. Particularly, when it is used in high temperature environments, it is possible to obtain the temperature sensor which has a sufficient degree of the durability.

The improvement of the durability may be achieved effectively by forming portions of the inner member and the outer member which are usually subjected to high temperature using the oxidation resistance metallic material.

When the metal cover is made of the oxidation resistance metallic material, the oxidation of the metal cover is avoided. This avoids a change in characteristic of the temperature sensitive device arising from a drop in concentration of oxygen in the metal cover.

Specifically, the oxidation of the metal cover will result in a decrease in concentration of oxygen within the metal cover, which may cause the oxygen to leave the temperature sensitive device, so that the temperature sensitive device is reduced, thus changing the performance thereof. Therefore, the metal cover may be made of oxidation resistance material to avoid the change in characteristic of the pressure sensitive device.

As the oxidation resistance material, there is stainless steel or inconel (trade mark in Inconel company).

The temperature sensitive device is preferably sealed by glass sealing material.

In this case, it is possible to decrease the deterioration of the temperature sensitive device, thereby providing the temperature sensor which is excellent in durability.

EMBODIMENTS

Embodiment 1

The temperature sensor according to an embodiment of the invention will be described below using FIGS. 1 to 4.

The temperature sensor 1 of this embodiment includes a temperature sensitive device 2 which is to be disposed in an exhaust pipe of an internal combustion engine, a pair of signal lines 31 which are connected at the top end side to the temperature sensitive device 2 and at the rear end side to lead wires 17 for connection with an external circuit, and an inner member 18 having a sheath pin 3 in which the signal lines 31 are disposed, and an outer member 13 disposed so as to surround at least a portion of an outer periphery of the inner member 18. The temperature sensor 1 has a metallic cover 4 disposed on a top end portion to cover the temperature sensitive device 2.

A guard tube 5 is disposed closer to the rear end side than the metallic cover 4 to cover the outer periphery of the sheath pin 3. The guard tube 5 has a rear end 52 thereof fixed to the sheath pin 3.

A rib 6 that is a portion fixed to an outer wall of the exhaust path is disposed on the outer periphery of the guard tube 5 to retain the sheath pin 3 through the guard tube 5.

In this embodiment, the rib 6 and the guard tube 5 are joined together to form an outer member 13.

Figure 4:
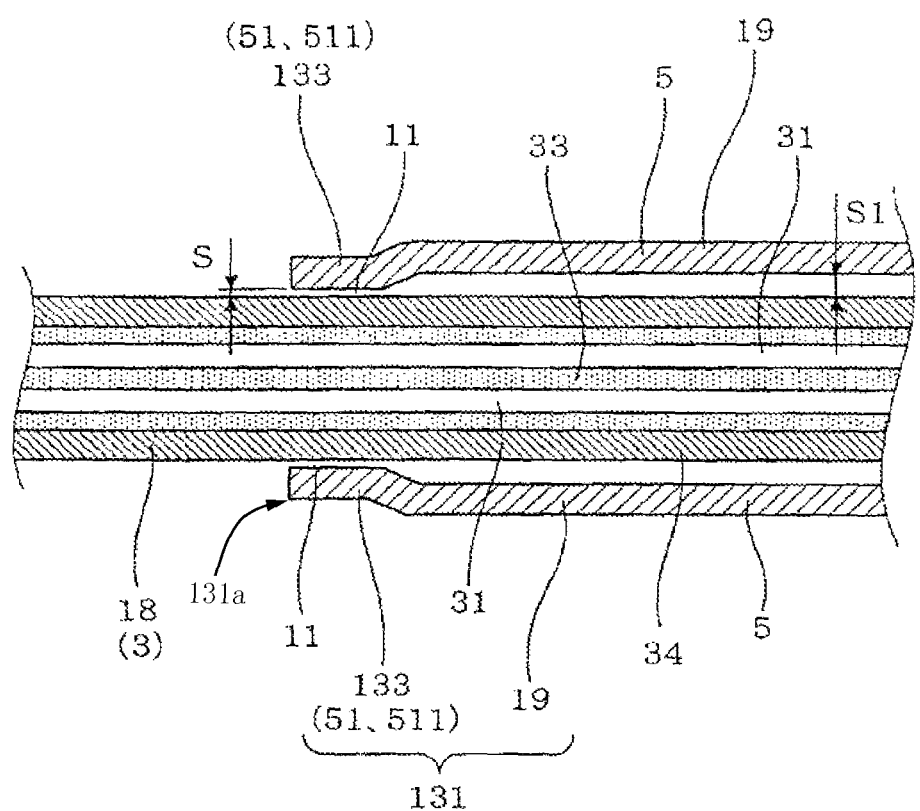
FIG. 4 is a longitudinal sectional view of a temperature sensor near a top end portion of a guard tube in the first embodiment.

The outer member 13 has a retainer portion 132 formed at the rear end 52 of the guard tube 5 to retain an inner member 18 defined by the sheath pin 3. The outer member 13 also has an extending portion 131 which is formed from the retainer portion 132 toward the top end side. The extending portion 131 includes a clearance portion 19 which defines an air gap between itself and the inner member 18 and a front interference portion 133 which is so disposed that a maximum gap between itself and the inner member 18 is less than or equal to 0.2 mm (i.e., the size of a portion of an air gap 11 at a circumferential location, as illustrated in FIG. 4, where S is maximized). As expressed by the maximum gap, a value representing a maximum vibrational amplitude is given, so that the frontal interference portion 133 works to suppress the vibrations. A free 131a of a top end portions of the extending portion 131 which is movable relative to the inner member 18 is shown in FIGS. 1 and 4.

The temperature sensitive device 2 is made of a thermistor. The electrodes 21 of the temperature sensitive device 2 are made of platinum or platinum alloy. The electrode 21 is 0.2 mm to 0.4 mm in diameter.

The guard tube 5 has small-diameter portions 511 and 521 formed at the top end 51 and the rear end 52 thereof. The small-diameter portions 511 and 521 have an inner peripheral surface extending parallel to an outer peripheral surface of the sheath pin 3.

In this embodiment, the small-diameter portion 521 at the rear end side works as the retainer portion 132 to retain the inner member 18 through the outer member 13. A portion between the small-diameter portions 521 and 511 is the clearance portion 19 which creates the air gap between itself and the inner member 18 (i.e., the sheath pin 3).

The rear end 52 of the guard tube 5 and the sheath pin 3 are welded together over entire circumferences thereof. Specifically, the small-diameter portion 521 of the guard tube 5 is welded to the outer peripheral surface of the sheath pin 3.

The rear end 52 of the guard tube 5 lies flush with the rear end 302 of the sheath pin 3. The rear ends 52 and 302 are welded together to make a joint between the guard tube 5 and the sheath pin 3.

The small-diameter portion 511 (i.e., the front interference portion 133) formed at the top end 51 of the guard tube 5 is not welded or fixed to the sheath pin 3, but located in contact therewith or away therefrom through an air gap. The air gap 11 is, as clearly illustrated in FIG. 4, created between the inner peripheral surface of the front interference portion 133 and the outer periphery of the sheath pin 3. The air gap 11 has a size S of 0.2 mm or less. The reasons for this will be described in detail in the test 2 which will be discussed later.

The clearance S1 between the inner member 18 (i.e., the sheath pin 3) and the clearance portion 19 has a size of 0.2 mm or more which is greater than the size S of the air gap 11.

As illustrated in FIG. 1, if the axial length between the tip of the extending portion 131 and the center of the temperature sensitive device 2 is defined as L1, the axial length between the tip of the extending portion 131 and the top end of the retainer portion 132 is defined as L2, and the axial length of the clearance portion 19 is defined as L3, a relation of $L3 \geq 0.3 \times (L1+L2)$ is met.

The axial lengths L1, L2, and L3 in the embodiments 8 to 11, as will be described later, are illustrated in corresponding FIGS. 11 to 14 and have the above relation.

The rib 6 is made up of a contacting portion 61 placed in abutment with a top end surface of an inner wall of a boss for installation on an internal combustion engine, a first extending portion 62 which extends behind the contacting portion 61 and is smaller in outer diameter than the contacting portion 61, and a second extending portion 63 which extends behind the first extending portion 62 and is further smaller in outer diameter than the contacting portion 61. The guard tube 5 is inserted into and fit inside the contacting portion 61, the first extending portion 62, and the second extending portion 63.

The protective tube 12 is welded at an end thereof to the outer periphery of the first extending portion 62 to cover the sheath pin 3, the guard tube 5, and external leads 17 partially.

The rib 6 is welded at the second extending portion 63 to the whole of circumference of the guard tube 5.

The metal cover 4 is welded to the whole of circumference of the top end 301 of the sheath pin 3.

The cement 14 is disposed between the temperature sensitive device 2 and the metal head cover 4 as a retaining member to hold or retain the temperature sensitive device 2 firmly.

The guard tube 5, the sheath pin 3, and the metal cover 4 are each made of stainless steel that is an oxidation resistance metallic material. Similarly, the rib 6 and the protective tube 12 are also made of stainless steel.

The guard tube 5 is greater in thickness than an outer tube 34 of the sheath pin 3 to have a higher degree of rigidity than that of the outer tube 34 of the sheath pin 3.

Figure 2:
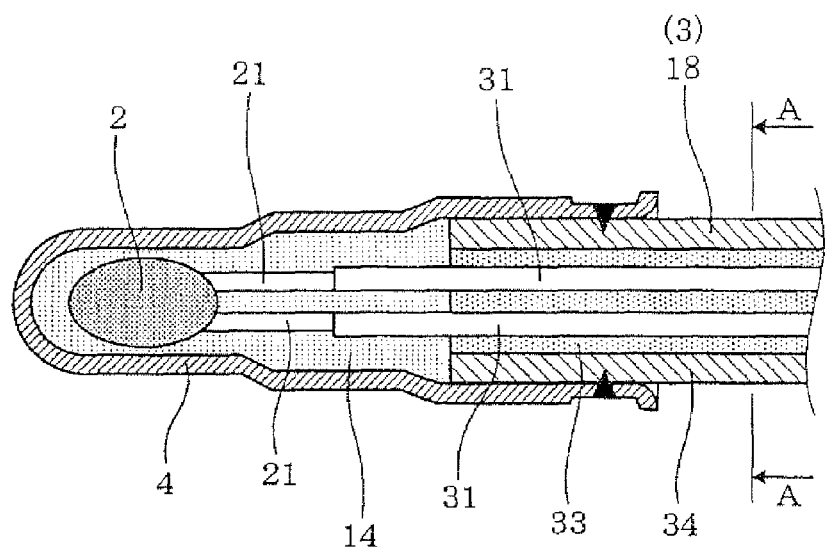
FIG. 2 is a longitudinal sectional view around a temperature sensor of the first embodiment.
Figure 3:
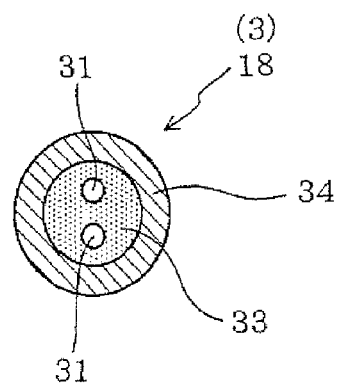
FIG. 3 is a cross sectional view, as taken along the line A-A of FIG. 2.

The sheath pin 3, as illustrated in FIGS. 2 and 3, includes the two signal lines 31 made of stainless steel, an insulator 33 which is made of insulating powder such as magnesia and disposed around the signal lines 31, and the outer tube 34 made of stainless steel covering the outer periphery of the insulator 33. The sheath pin 3 is cylindrical. The outer tube 34 is hollow cylindrical. The signal lines 31, as clearly illustrated in FIGS. 1 and 2, are exposed to the top end side to the rear end side from the insulator 33 and the outer tube 34, respectively. The top end of each of the signal lines 31 is connected to one of the electrodes 21 of the thermister device 2. The rear end of each of the signal lines 31 is connected to one of the external leads 17.

Next, the operation and effects of this embodiment will be described below.

In the temperature sensor 1, the guard tube 5 is interposed between the rib 6 and the sheath pin 3. Specifically, the rib 6 retains the sheath pin 3 through the guard tube 5. This blocks mechanical vibrations of the internal combustion engine from being transmitted from the rib 6 directly to the sheath pin 3. The guard tube 5 works to dampen the mechanical vibrations before traveling to the sheath pin 3.

In the temperature sensor 1, the outer member 13 (i.e., the rib 6 and the guard tube 5) has the clearance portion 19 formed in the extension portion 131 to define the air gap between itself and the inner member 18 (i.e., the sheath pin 3), thereby blocking the mechanical vibrations of the engine from being transmitted directly to the inner member 18 through the rib 6 to minimize the vibration of the inner member 18 (i.e., the sheath pin 3).

Even if the vibrations have been transmitted to the inner member 18 (i.e., the sheath pin 3), so that the inner member 18 has begun to vibrate, the front interference portion 133 (i.e., the small-diameter portion 511 of the guard tube 5) of the extending portion 131 of the outer member 13 works to suppress the amplitude of the inner member 18. This prevents the amplitude of the inner member 18 (i.e., the sheath pin 3) from increasing and results in a decrease in acceleration exerted on the top of the inner member 18 (i.e., the sheath pin 3).

Specifically, the inner member 18 vibrates like a cantilever. In this case, the number of vibrations (i.e., frequency) is constant. The acceleration of the top end 301 of the inner member 18, therefore, depends upon the amplitude, so that it is, as described above, decreased by decreasing the amplitude.

When the inner member 18 (i.e., the sheath pin 3) resonates at a natural frequency thereof, the front interference portion 133 interferes with the inner member 18 (i.e., the sheath pin 3) to suppress such resonance.

In the case where the inner member 18 (i.e., the sheath pin 3) and the outer member 13 (i.e., the guard tube 5) are different in natural frequency, they interfere with each other to suppress the vibration of the inner member 18 (i.e., the sheath pin 3).

As a result, the acceleration acting on the temperature sensitive device 2 located closer to the top of the inner member 18 (i.e., the sheath pin 3) is decreased, thereby decreasing the stress exerted on the temperature sensitive device 2. This avoids the breakage of the temperature sensitive device 2 itself or the disconnection of the electrodes 21 of the temperature sensitive device 2 to improve the durability of the temperature sensor 1.

The front interference portion 133 is, as already described, so set as to meet the relation of $L3 \geq 0.3 \times (L1+L2)$, thereby ensuring the ability of the front interference portion 133 of the extending portion 131 of the outer member 13 to attenuate the vibration of the inner member 18. Specifically, when the front interference portion 133 is located where the above condition is met, it will be formed at a location far from the retainer portion 132 for the outer member 133 and the inner member 18. In other words, the front interference portion 133 is positioned where the amplitude of the vibration of the inner member 18 is increased, thus enhancing the ability of the front interference portion 133 to absorb the amplitude of vibration of the inner member 18. Even when the inner member 18 resonates, the front interference portion 133 interferes with the inner member 18 at an initial stage of the resonance, thereby suppressing the resonance of the inner member 18.

The front interference portion 133 formed at the top end 51 of the guard tube 5 is not joined to the sheath pin 3, but has a gap of 0.2 mm or less and is in contact therewith, thus blocking the transmission of vibration from the top end 51 to the sheath pin 3.

If the top end 51 of the guard tube 5 is welded to the sheath pin 3, it may cause the vibration to be transmitted directly to the sheath pin 3 through the top end 51, thus resulting in a difficulty in suppressing the transmission of vibration to the sheath pin 3. Accordingly, the top end 51 of the guard tube 5 is not welded to the sheath pin 3 to suppress the transmission of vibration from the top end 51 to the sheath pin 3.

The size S of the air gap between the front interference portion 133 and the inner member 18 (i.e., the sheath pin 3), that is, between the inner periphery of the small-diameter portion 511 formed at the top end 51 of the guard tube 5 and the outer periphery of the sheath pin 3 is, as described above, 0.2 mm or less, thereby blocking a certain amount of vibration from being transmitted the top end 51 to the guard tube 5 and suppressing or attenuating the vibration of the sheath pin 3 itself through the top end 51 to control the vibration of the sheath pin 3.

The size of the air gap 11 is a maximum, as measured by taking a sectional surface which is vertical in an axial direction and includes the front interference portion 133 and the inner member 18 of the temperature sensor 1 and observing the sectional area using a scanning electron microscope (SEM).

The front interference portion 133 has a parallel portion parallel to the outer periphery of the inner member 18 (i.e., the sheath pin 3). The provision of the parallel portion results in an increased area of contact between the inner member 18 and the front interference portion 133 to decrease the wear of the front interference portion 133.

The rear end 52 of the guard tube 5 and the sheath pin 3 are welded at the entire circumferences thereof together, thereby blocking the entry of exhaust gas from between the guard tube 5 and the sheath pin 3 into the temperature sensor 1.

The guard tube 5 and the rib 6 are welded over the entire circumferences thereof together, thereby avoiding the entry of exhaust gas from between the guard tube 5 and the rib 6 into the temperature sensor 1.

The guard tube 5 has the small-diameter portions 511 and 521 formed at the front end 51 and the rear end 52. The small-diameter portions 511 and 521 serve to hold or guide the sheath pin 3. The middle portion of the guard tube 5 between the small-diameter portions 511 and 521 may be spaced away from the sheath pin 3 and, thus, serves as a spring to dampen or absorb the vibration of the rib 6 to minimize the amount of vibration transmitted to the sheath pin 3.

The temperature sensitive device 2 is made of thermister, thus ensuring the high measurement accuracy.

The retaining member (i.e., the cement 14) is disposed between the temperature sensitive device 2 and the metal cover 4 to retain the temperature sensitive device 2, thereby avoiding the hitting of the temperature sensitive device 2 against the metal cover 4 when the temperature sensor 1 vibrates, which avoids the damage to the temperature sensitive device 2 and disconnection of the electrodes 21, and ensures the durability of the temperature sensor 1.

It is possible to transmit thermal energy from outside the metal cover 4 to the temperature sensitive device 2 quickly, thereby resulting in an increase in response rate of the temperature sensor 1.

The guard tube 5, the sheath pin 3, and the metal cover 4 are each made of stainless steel that is an oxidation resistance metallic material, thus ensuring an increased level of durability thereof. Particularly, when used in a hot environment, they assure the desired durability.

The metal cover 4 is made of oxidation resistance material (stainless steel), thus avoiding the oxidation of the metal cover 4 to avoid a change in characteristic of the temperature sensitive device 2 arising from a drop in concentration of oxygen within the metal cover 4.

Specifically, the oxidation of the metal cover 4 will result in a decrease in concentration of oxygen within the metal cover 4, which may cause the oxygen to leave the temperature sensitive device 2, so that the temperature sensitive device 2 is reduced, thus changing the performance thereof. Therefore, the metal cover 4 may be made of oxidation resistance material to avoid the change in characteristic of the pressure sensitive device 2.

As described above, this embodiment suppresses the transmission of vibration and provides temperature sensors which are excellent in durability.

Embodiment 2

This embodiment is to provide the temperature sensor 1 in which the air gap 11 (see FIG. 4) is not formed between the inner peripheral surface of the top end 51 of the guard tube 5 and the outer peripheral surface of the sheath pin 3.

Specifically, the temperature sensor 1 of this embodiment is so designed that the size S of the air gap 11 in FIG. 4 is zero (0).

In this embodiment, the top end 51 of the guard tube 5 may be placed in contacting abutment with the sheath pin 3. The top end 51 of the guard tube 5 is not fixed to the sheath pin 3 through, for example, welding. In this case, the parallel portion of the front interference portion 133 is in contact with the inner member 18 (i.e., the sheath pin 3), that is, placed in surface contact therewith when the size S of the air gap 11 is almost zero (0).

Other arrangements are identical with those in the first embodiment. The same effects as in the first embodiment are provided.

Test Example 1

This example is an example where heating and resonance tests were made on the temperature sensor of the invention and conventional temperature sensors.

As invention products, the temperature sensors 1, as shown in the first embodiment, were used. In the temperature sensor 1, the metal cover 4, the guard tube 5, and the sheath pin 3 are made of SUS310S.

The temperature sensors 1 have the following dimensions.

Figure 6:
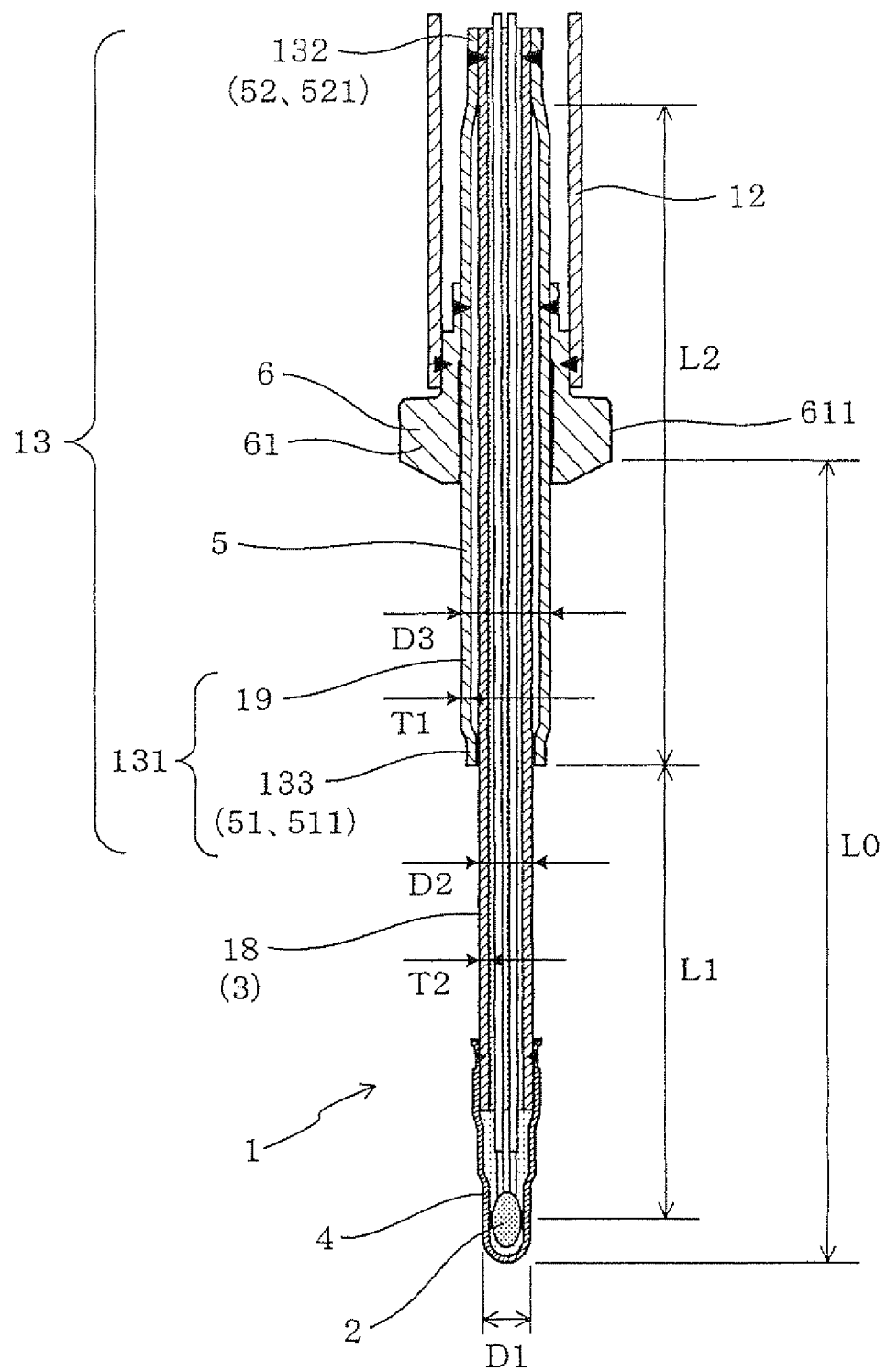
FIG. 6 is an explanatory view explaining a dimension of each part of a temperature sensor used as a sample in an experimental example 1.

The length L0, as illustrated in FIG. 6, between the top end of the outer peripheral surface 611 of the contacting portion 61 of the rib 6 and the tip of the temperature sensor 1 is 38 mm. The length L1 between the tip of the small-diameter portion 511 of the guard tube 5 and the center of the temperature sensitive device 2 is 18 mm. The length L2 between the tip of the small-diameter portion 511 and the tip of the small-diameter portion 521 of the guard tube 5 is 33 mm.

The outer diameter D1 of the metal cover 4 around the temperature sensitive device 2 is 2.5 mm. The outer diameter D2 of the sheath pin 3 is 2.3 mm. The outer diameter D3 of a portion of the guard tube 5 other than the small-diameter portions 511 and 521 is 4.0 mm. The thickness T1 of the guard tube 5 is 0.5 mm. The thickness T2 of the outer tube 34 of the sheath pin 3 is 0.3 mm. The size S of the air gap 11 (see FIG. 4) that is the interval between the inner periphery of the top end 51 of the guard tube 5 and the outer periphery of the sheath pin 3 is 0.05 mm.

We prepared two types of samples: one having the cement 14 disposed between the temperature sensitive device 2 and the metal cover 4, and the second not having the cement 14. The electrodes 21 of the pressure sensitive device 2 is a platinum wire having a diameter of 0.3 mm.

In the above temperature sensors 1, the natural frequency of the top side thereof is 1.0 kHz.

Figure 9:
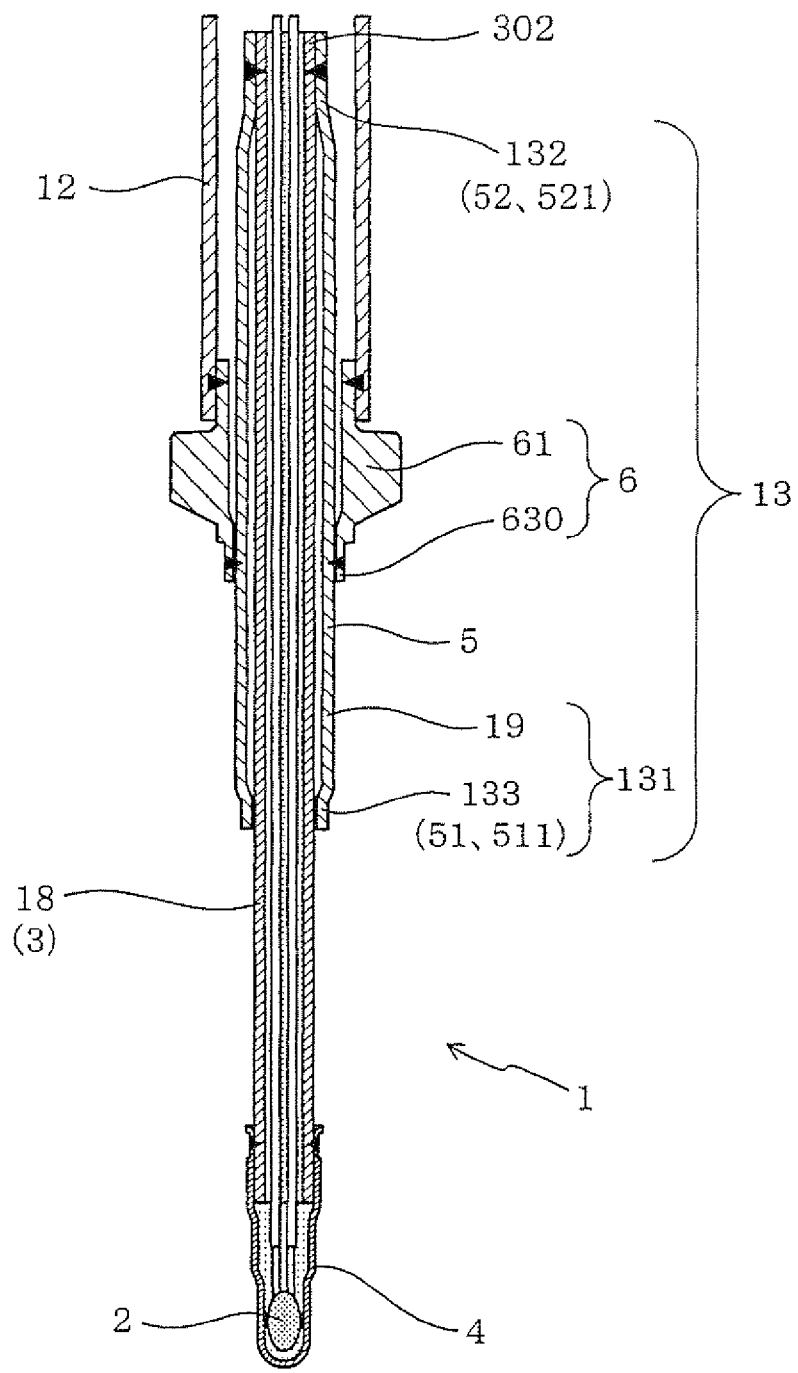
FIG. 9 is a longitudinal sectional view of a temperature sensor in the sixth embodiment.

As comparative temperature sensors, temperature sensors 9, as illustrated in FIG. 9, were prepared.

In the temperature sensors 9, the rib 6 retains the sheath pin 3 directly, that is, the guard tube 5 is not interposed between the rib 6 and the sheath pin 3. The rib 6 is welded at the entire circumference thereof to the sheath pin 3.

The metal cover 4 and the sheath pin 3 are made of SUS310S.

The temperature sensors 9 have the following dimensions.

Figure 30:
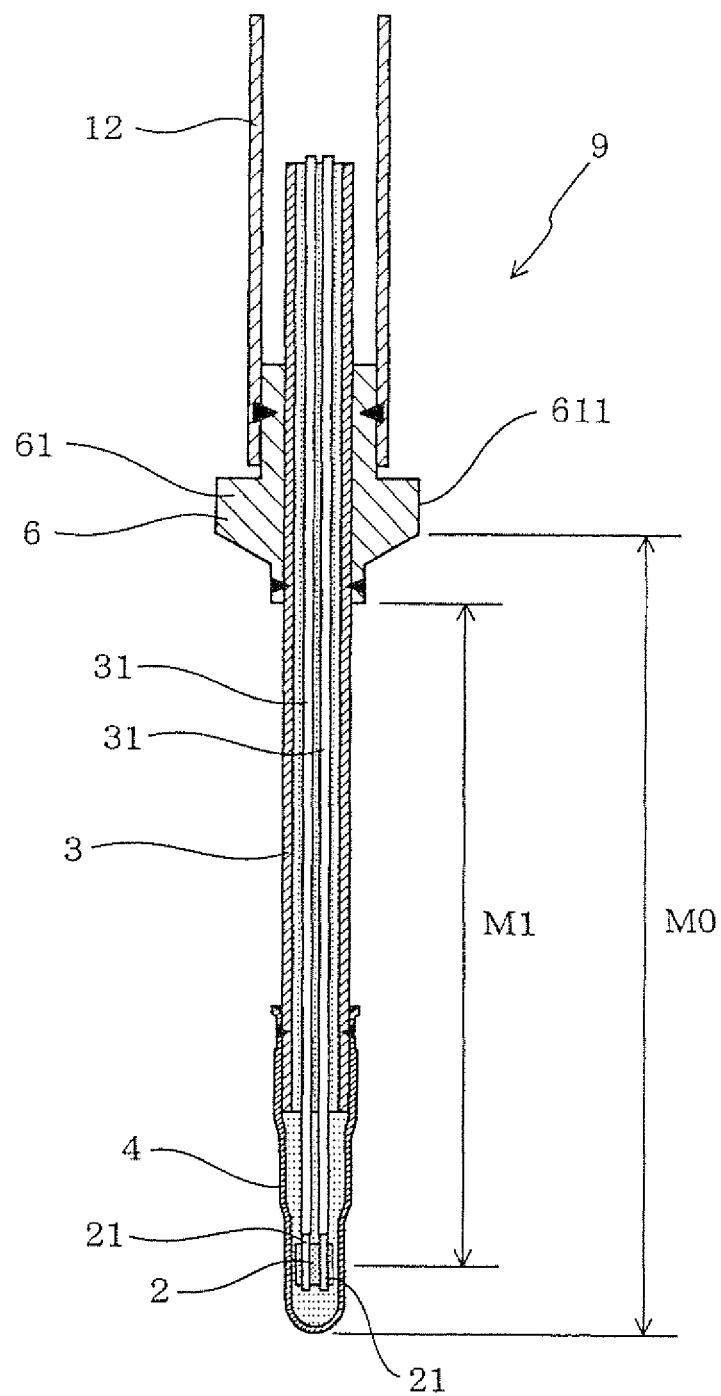
FIG. 30 is a longitudinal sectional view of a temperature sensor in a conventional example.
Figure 31:
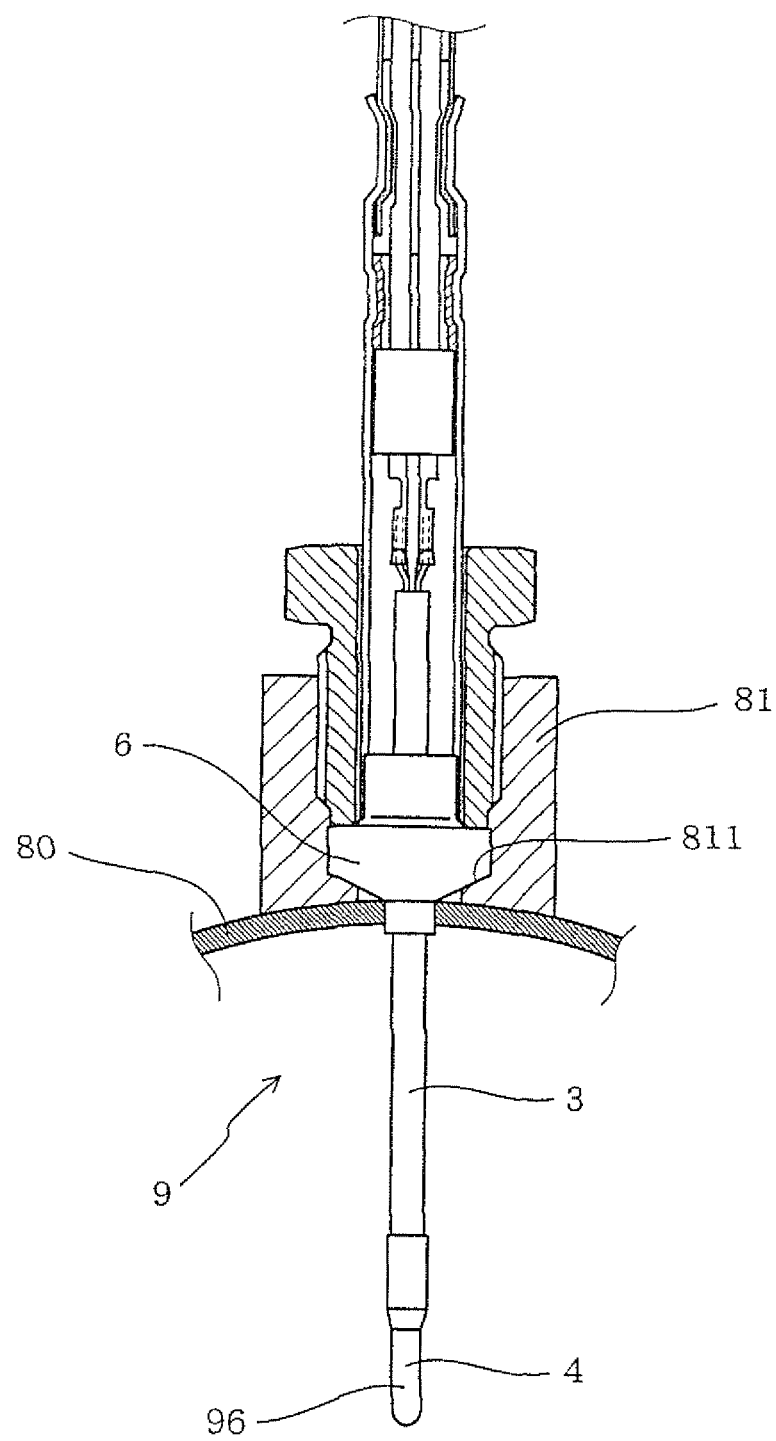
FIG. 31 is a longitudinal sectional view of a temperature sensor installed in an exhaust system of an internal combustion engine in a conventional example.

The length M0, as illustrated in FIG. 30, between the tip of the outer peripheral surface 611 of the contacting portion 61 of the rub 6 and the tip of the temperature sensor 1 is 38 mm. The length M1 between the top end of the rib 6 and the center of the pressure sensitive device 2 is 31 mm. The outer diameters of the metal cover 4 around the temperature sensitive device 2 and the sheath pin 3 and the thickness of the outer tube 34 of the sheath pin 3 are identical with those in the invention products.

We also prepared two types of comparative examples: one having the cement 14 disposed between the temperature sensitive device 2 and the metal cover 4, and the second not having the cement 14.

In the temperature sensors 9, the natural frequency of the top side thereof is 1.0 kHz.

Figure 5:
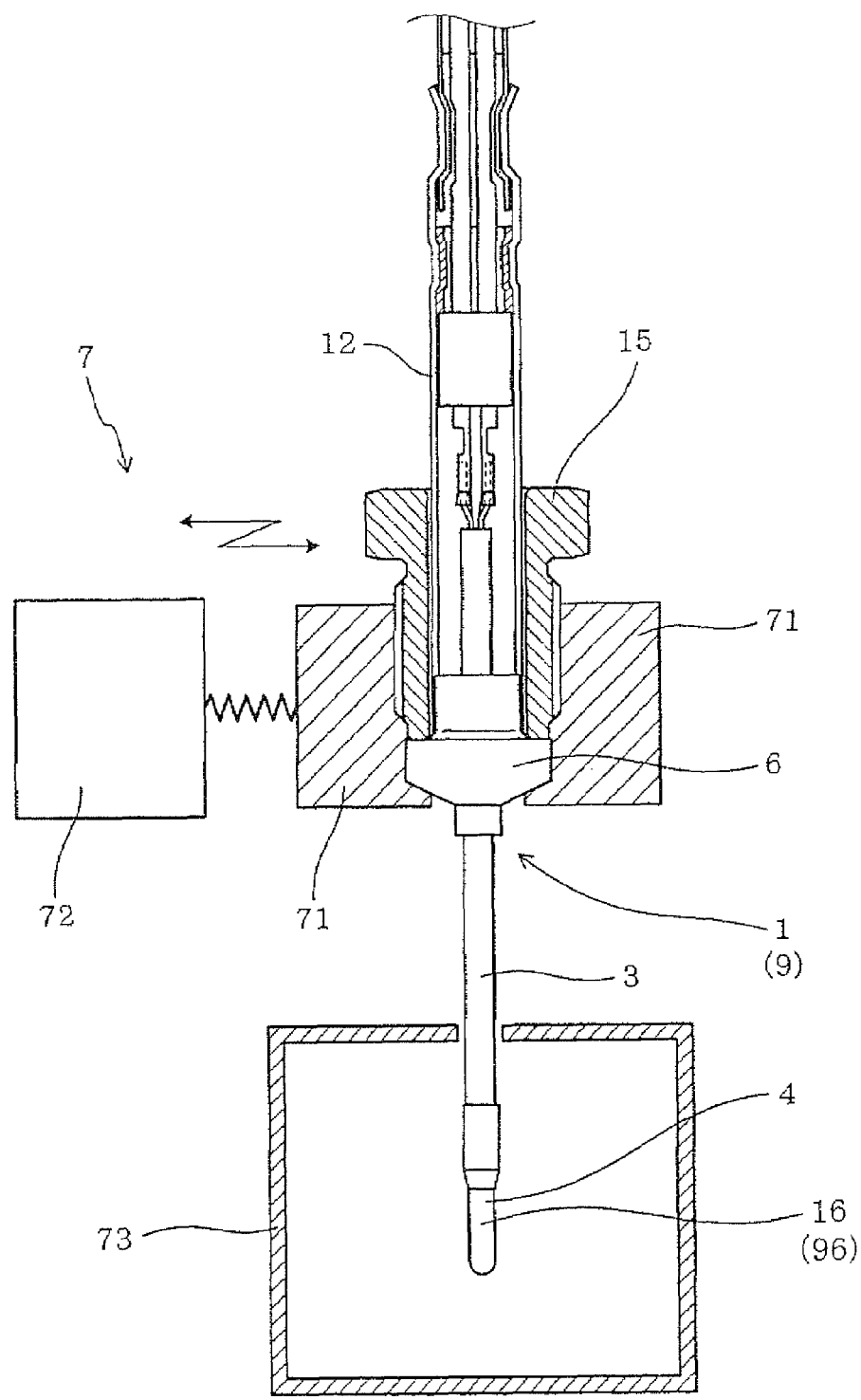
FIG. 5 is an explanatory view showing a testing method of heating resonance test in an experimental example 1.

We performed durability testes on these samples using a vibration testing machine 7, as illustrated in FIG. 5. In FIG. 5, the guard tube 5 is omitted.

The vibration testing machine 7 includes a sensor holder 71 and a vibrator 72 to vibrate the sensor holder 71.

The temperature sensors 1 (9) were installed in the sensor holder 71 through a housing 15. The tip of each of the temperature sensors 1 (9), that is, a sensitive head 16 (96) within which the temperature sensitive device 2 was disposed was placed inside a heater 73 and heated at 850° C.

Subsequently, the vibrator 72 was actuated to vibrate the sensor holder 71 in a direction perpendicular to the axial direction of the temperature sensor 1 (9) at a frequency of 0.8 kHz to 1.5 kHz at which the tip of the temperature sensor 1 (9) will resonate.

An acceleration of gravity of 20 G was exerted on some of the samples not having the cement 14, while an acceleration of gravity of 40 G was exerted on the remaining samples equipped with the cement 14.

In this way, the vibrations were exerted continuously on the temperature sensor 1 (9).

Results of the tests show that in the comparative temperature sensors not having the cement 14, the electrodes (platinum) 21 are disconnected from the temperature sensitive device 2 after a lapse of ten (10) minutes, and in those having the cement 14, the joint between the rib 6 and the sheath pin 3 is broken after a lapse of fifteen (15) minutes.

The results of the tests also show that in any of the temperature sensors 1, the electrodes 21 are not disconnected from the temperature sensitive device 2, and the sheath pin 3 is still kept retained firmly after a lapse of three hundreds (300) minutes.

It is, therefore, found that the temperature sensor of the first embodiment is excellent in durability in hot environments equivalent to actual service conditions and resistance to vibrations.

Test Example 2

In this example, we also performed heating resonance tests on three types: one having the top end 51 of the guard tube 5 and the sheath pin 3 welded together, the second having the top end 51 crimped to make a joint to the sheath pin 3 without being welded together, and the third having the air gap 11, as illustrated in FIG. 4, between the inner periphery of the top end 51 of the guard tube 5 and the outer periphery of the sheath pin 3. The heating resonance tests were conducted in the same manner, as in the first tests described above. The electrodes 21 of the temperature sensitive device 2 are made of platinum wire having a diameter of 0.3 mm.

We prepared first samples in which the top end 51 of the guard tube 5 was welded to the sheath pin 3 at entire circumferences thereof, second samples in which the top end 51 of the guard tube 5 was crimped to make a mechanical joint to the sheath pin 3, and third to fifth samples in which the air gap 11 between the top end 51 of the guard tube 5 and the sheath pin 3 had sizes S of 0.1 mm, 0.2 mm, and 0.3 mm, respectively.

Other dimensions of each of these temperature sensors are identical with those in the temperature sensor 1, as described in the first embodiment.

We performed the same heating and resonance tests, as in the first tests, on each of the first to fifth samples.

Results of the tests are shown in table 1.

TABLE 1

| Sample No. | Fixing to sheath pin or air gap | Durability time (minute) | Evaluation |
|---|---|---|---|
| 1 | Entire circumference welding | 20 | X |
| 2 | 0 mm (contact) | 300 | ○ |
| 3 | Air gap 0.1 mm | 300 | ○ |
| 4 | Air gap 0.2 mm | 300 | ○ |
| 5 | Air gap 0.3 mm | 15 | X |

In the first samples (the entire circumference welded), the electrodes 21 were disconnected from the temperature sensitive device 2 after a lapse of twenty (20) minutes.

In the second samples (crimped), the third samples (the size S of the air gap 11 is 0.1 mm), and fourth samples (the size S of the air gap 11 is 0.2 mm), the electrodes 21 were kept connected to the temperature sensitive device 2, and the rib 6 was kept joined to the sheath pin 3 firmly after a lapse of three hundreds (300) minutes.

In the fifth samples (the air gap 11 is 0.3 mm), the joint between the rib 6 and the sheath pin 3 was broken after a lapse of fifteen (15) minutes.

It is, therefore, found that when the top end 51 of the guard tube 5 is not welded to the sheath pin 3, the temperature sensor 1 has an enhanced resistance to vibrations in hot environmental conditions close to actual service conditions.

It is also found that when the size S of the air gap 11 between the inner periphery of the top end 51 of the guard tube 5 and the outer periphery of the sheath pin 3 is 0.2 mm or less, the temperature sensor 1 has an enhanced resistance to the vibrations.

Embodiment 3

This embodiment is an embodiment of the temperature sensor 1 in which the temperature sensitive device 2 is hermetically sealed by glass.

Other arrangements are identical with those in the first embodiment.

In this embodiment, it is possible to ensure the temperature measurement when the temperature sensor 1 is used in hot environmental conditions where a maximum temperature is 1000° C.

Specifically, in the above hot environment, the oxidation of the metal head cover 4 surrounding the temperature sensitive device 2 is accelerated, which result in a drop in concentration of oxygen within the metal head cover 4. This may cause the oxygen to leave the temperature sensitive device 2 to compensate for the drop in concentration of oxygen, so that the temperature sensitive device 2 is reduced, thus changing the performance thereof. The sealing of the temperature sensitive device 2 with the glass material minimizes this problem and ensures the accurate temperature measurement in the hot environment.

The same other effects as in the first embodiment are provided.

Embodiment 4

Figure 7:
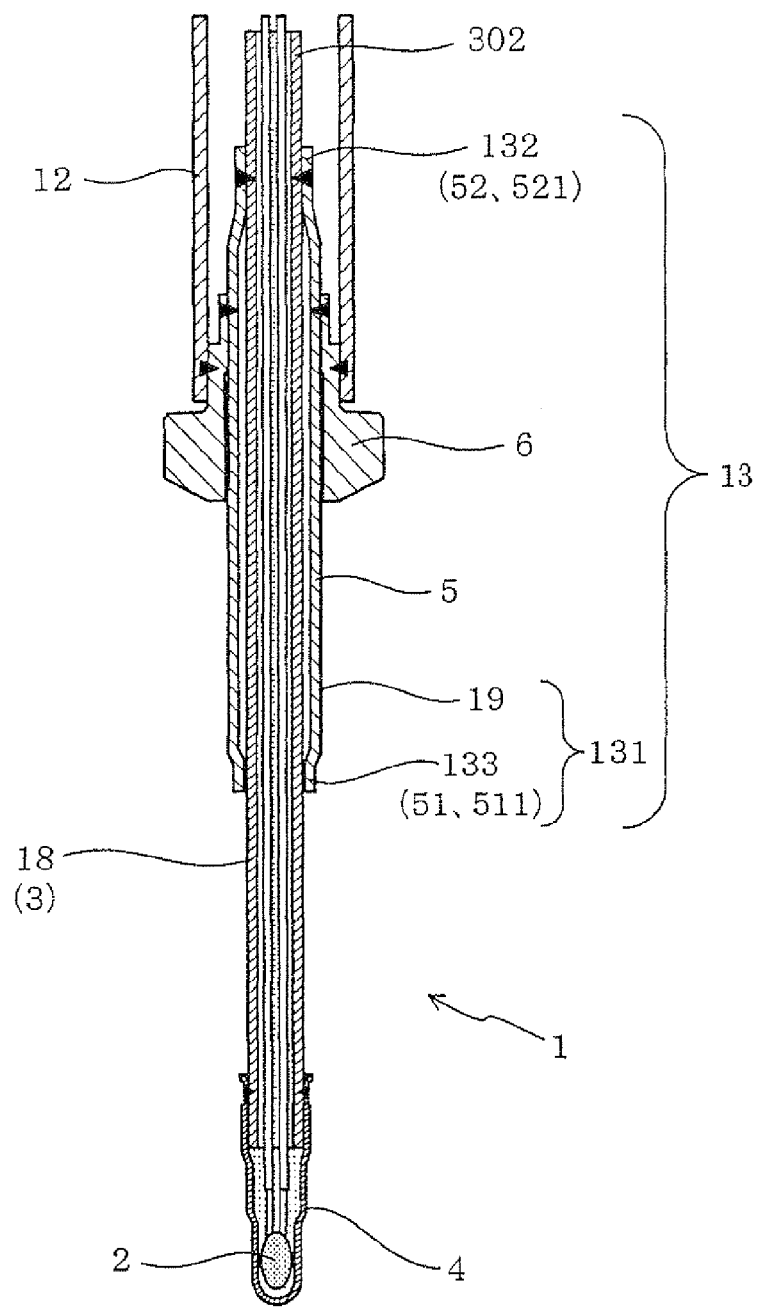
FIG. 7 is a longitudinal sectional view of a temperature sensor in the fourth embodiment.

This embodiment, as illustrated in FIG. 7, is an embodiment in which the arrangement of the guard tube 5 is changed.

The temperature sensor 1 of this embodiment is such that the rear end 52 of the guard tube 5 is located closer to the rib 6 than the rear end 302 of the sheath pin 3.

Other arrangements are identical with those in the first embodiment.

Embodiment 5

Figure 8:
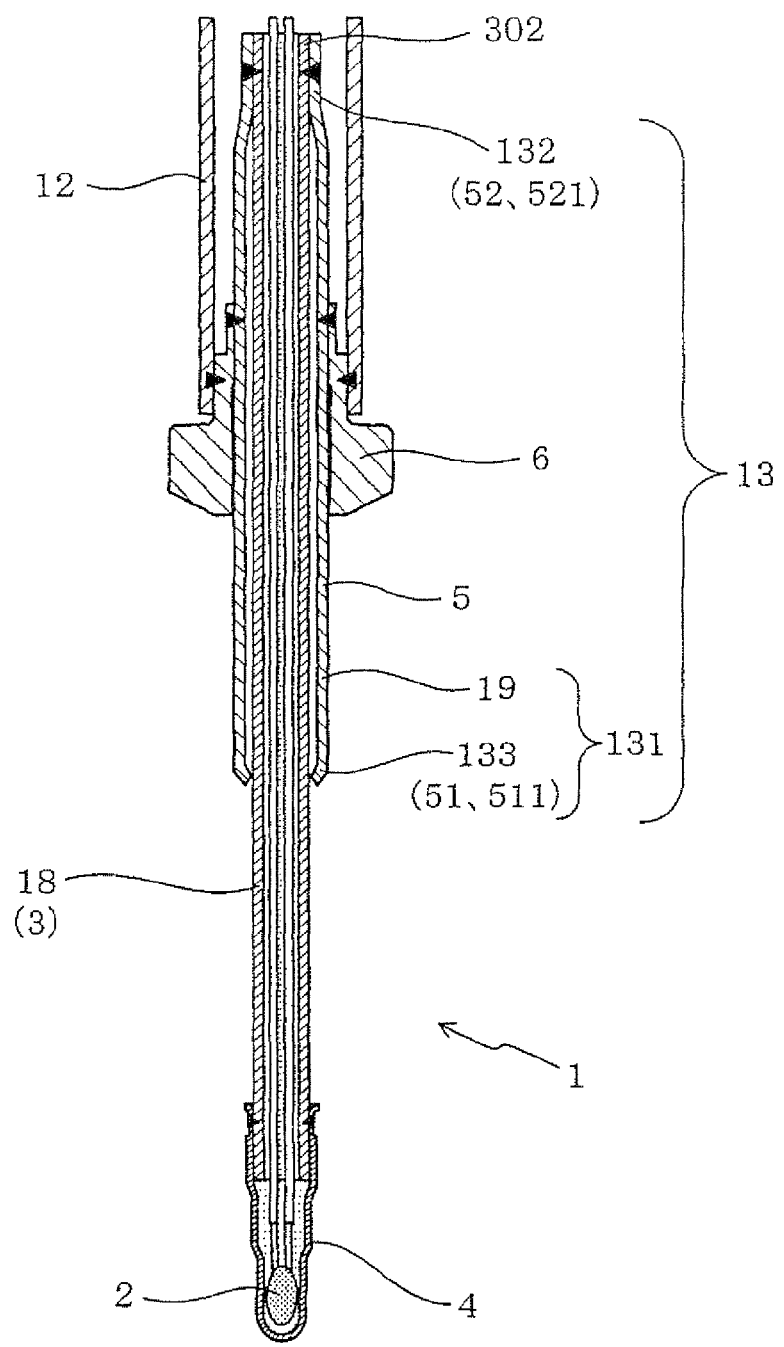
FIG. 8 is a longitudinal sectional view of a temperature sensor in the fifth embodiment.

This embodiment is, as illustrated in FIG. 8, an embodiment in which the shape of the guard tube 5 is changed.

The temperature sensor 1 of this embodiment is an embodiment in which the small-diameter portion 511 of the guard tube 5 is modified in shape. Specifically, the small-diameter portion 511 of the first embodiment is, as illustrated in FIG. 1, has the parallel portion parallel to the outer peripheral surface of the sheath pin 3. In the temperature sensor 1 of this embodiment, the small-diameter portion 511 does not have the parallel portion parallel to the outer peripheral surface of the sheath pin 3.

Other arrangements are identical with those in the first embodiment.

Embodiment 6

This embodiment is, as illustrated in FIG. 9, an embodiment in which the shape of the rib 6 is changed.

The temperature sensor 1 of this embodiment is such that the rib 6 has a second extending portion 630 extending from the top of the contacting portion 61. The second extending portion 630 is smaller in outer diameter than the contacting portion 61 and extends along the outer periphery of the guard tube 5.

At the second extending portion 630, the rib 6 and the guard tube 5 are welded through entire circumferences thereof.

Other arrangements are identical with those in the first embodiment.

Embodiment 8

Figure 10:
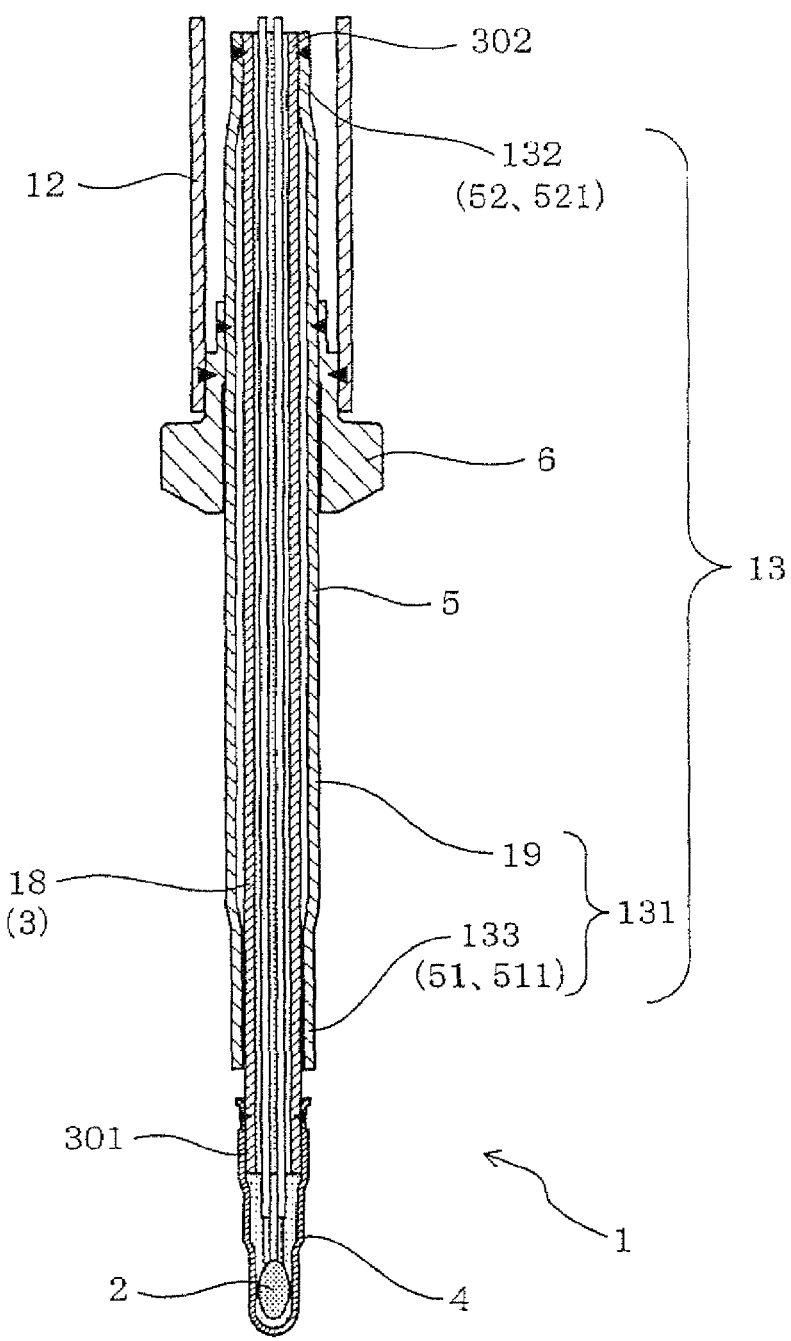
FIG. 10 is a longitudinal sectional view of a temperature sensor in the seventh embodiment.

This embodiment is, as illustrated in FIG. 10, an embodiment in which the arrangement of the guard tube 5 is modified.

The temperature sensor 1 of this embodiment is such that the top end 51 of the guard tube 5 is located closer to the top end 301.

Other arrangements are identical with those in the first embodiment.

In this embodiment, the top end 51 of the guard tube 5 works to suppress the amplitude of vibration of the sheath pin 3 near the top end 301. The temperature sensor 1 in each of the first to sixth embodiments is designed to suppress the amplitude of vibration of the sheath pin 3 at the antinode, but the one in this embodiment works to suppress the vibration near the top end 301.

The same other effects, as in the first embodiment, are provided.

Embodiment 8

Figure 11:
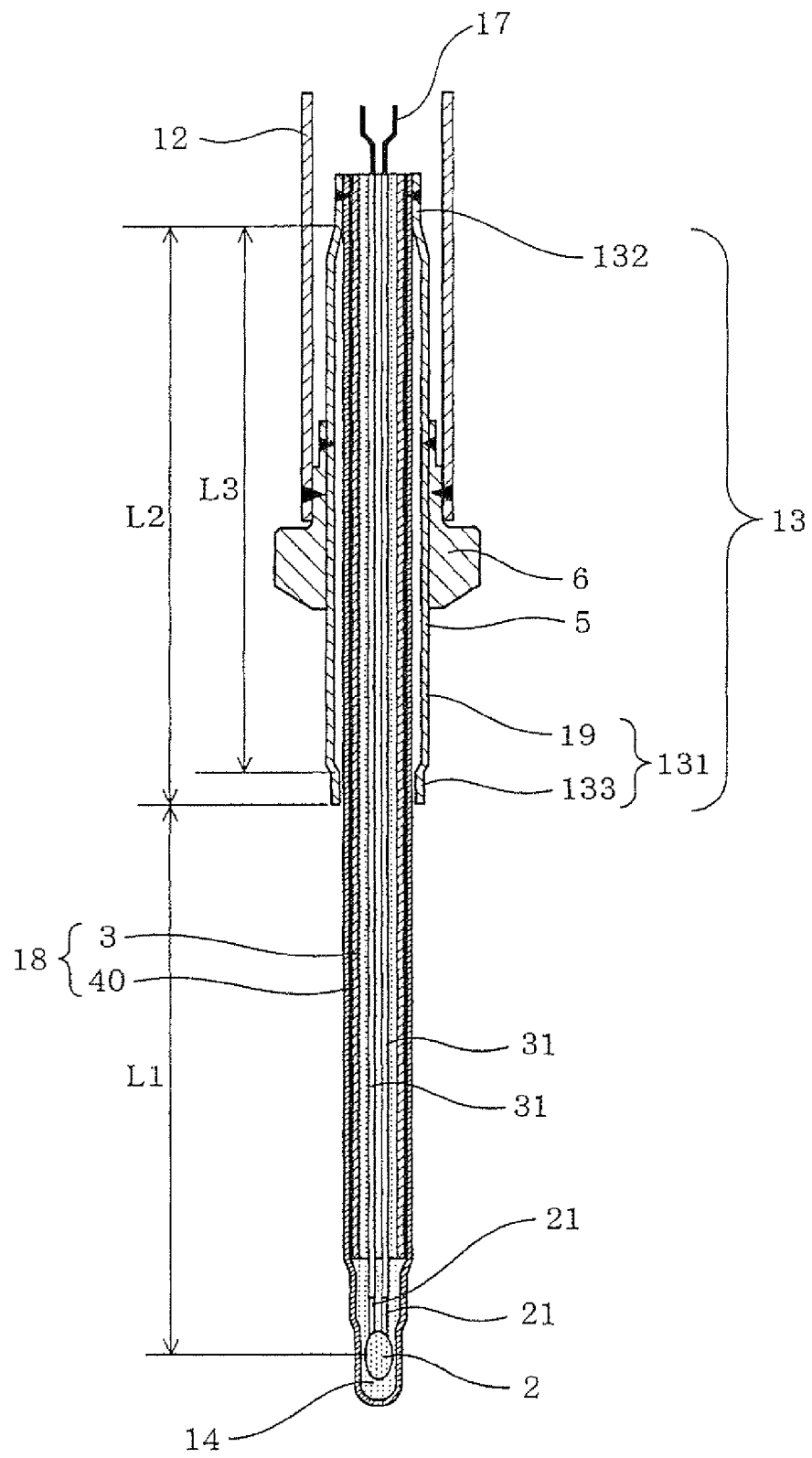
FIG. 11 is a longitudinal sectional view of a temperature sensor in the eighth embodiment.

This embodiment is, as illustrated in FIG. 11, an embodiment in which the metal tube 40 which covers the outer circumference of the sheath pin 3 and the temperature sensitive device 2 is provided, and the guard tube 5 is disposed inside the rib 6.

Specifically, the inner member 18 made up of the sheath pin 3 and the metal tube 40 is held by the outer member 13 made up of the rib 6 and the guard tube 5 at the retainer portion 132. The extending portion 131 made by a portion of the guard tube 5 has formed therein the clearance portion 19 which defines an air gap between itself and the metal tube 40.

Other arrangements are identical with those in the first embodiment.

In this embodiment, the same operation and effects, as in the first embodiment, are achieved.

Embodiment 9

Figure 12:
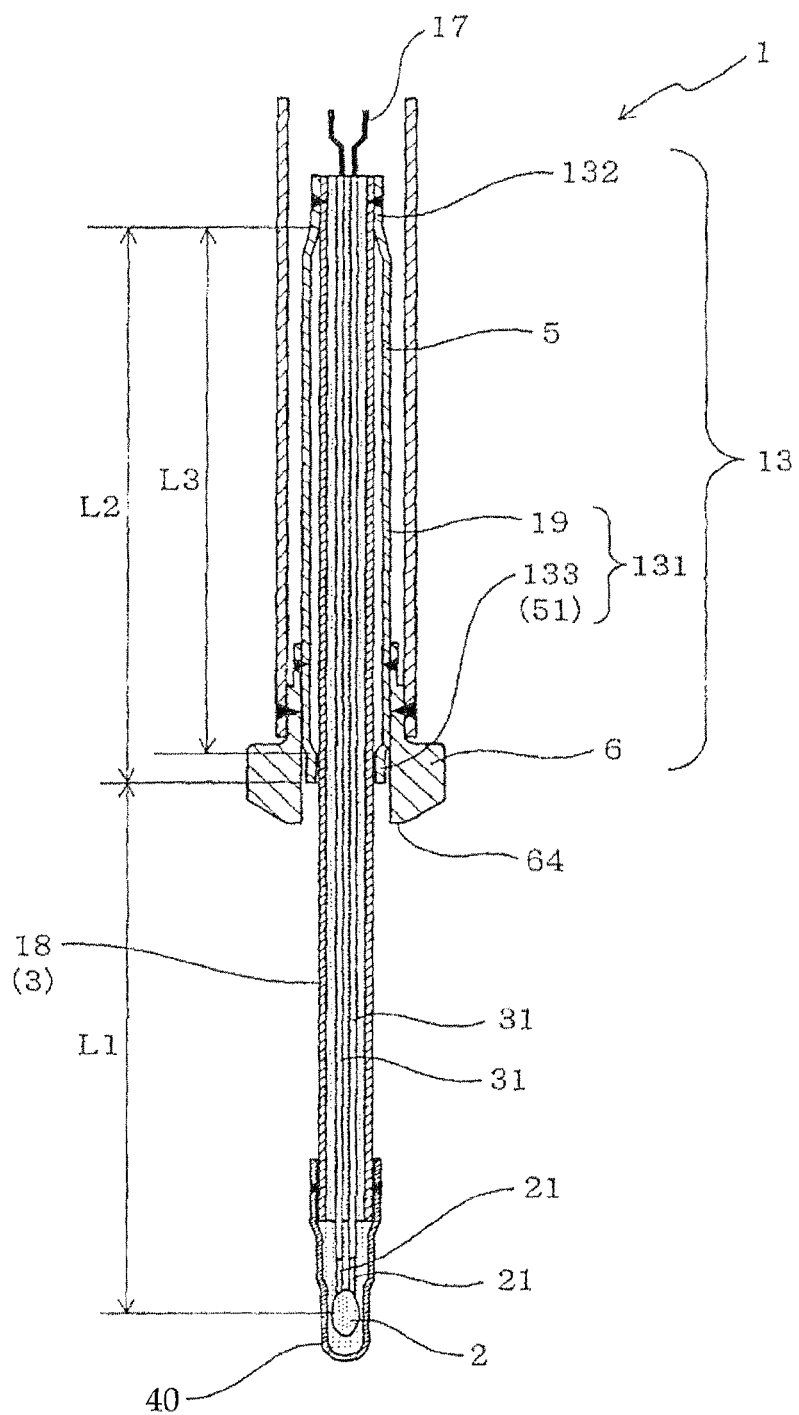
FIG. 12 is a longitudinal sectional view of a temperature sensor in the ninth embodiment.

This embodiment is, as illustrated in FIG. 12, an embodiment in which the top end (i.e., the front interference portion 133) of the extending portion 131 of the outer member 13 does not protrude from the rib 6.

Specifically, the temperature sensor 1 of this embodiment, like in the first embodiment, is so designed that the outer member 13 is made up of the rib 6 and the guard tube 5, but the top end (i.e., the front interference portion 133) of the extending portion 131 made by a portion of the guard tube 5 is located behind the top end surface 64 of the rib 6.

Other arrangements are identical with those in the first embodiment.

In this embodiment, the same operation and effects, as in the first embodiment, are achieved.

Embodiment 10

Figure 13:
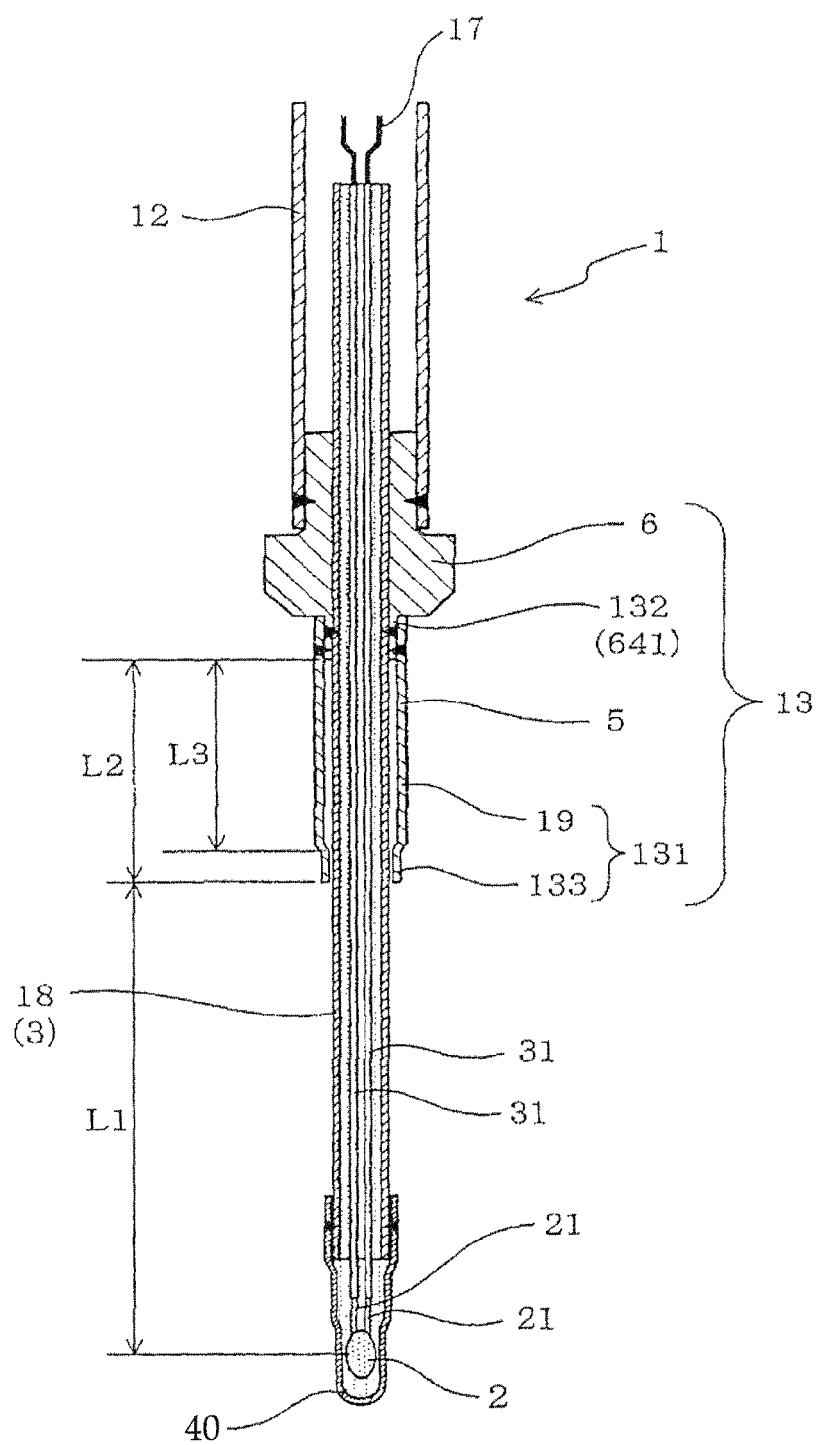
FIG. 13 is a longitudinal sectional view of a temperature sensor in the tenth embodiment.

This embodiment, as illustrated in FIG. 13, is an embodiment in which the sheath pin 3 that is the outer member 18, is retained directly by the rib 6, and the guard tube 5 is secured to the top end of the rib 6.

Specifically, the sheath pin 3, as in the first embodiment, is not retained by the rib 6 through the guard tube 5, but it is retained directly by the rib 6. The guard tube 5 is welded directly to the outer circumference of the front extending portion 641 formed in the top end of the rib 6. The sheath pin 3 that is the inner member 18 is welded to the rib 6.

Specifically, the front extending portion 641 is the retainer portion 132.

The guard tube 5 is prolonged toward the top end side to form the extending portion 131 to have the top end serving as the front interference portion 19.

In this embodiment, the rib 6 and the guard tube 5 constitute the outer member 13. The clearance portion 19 is formed between the guard tube 5 (i.e., the extending portion 131) and the sheath pin 3 (i.e., the inner member 18).

Other arrangements are identical with those in the first embodiment.

In this embodiment, the front interference portion 133 of the extending portion 131 works to have effects in which it suppress, as shown in the first embodiment, the vibration of the inner member 18.

The same operation and effects, as in the first embodiment, are achieved.

Embodiment 11

Figure 14:
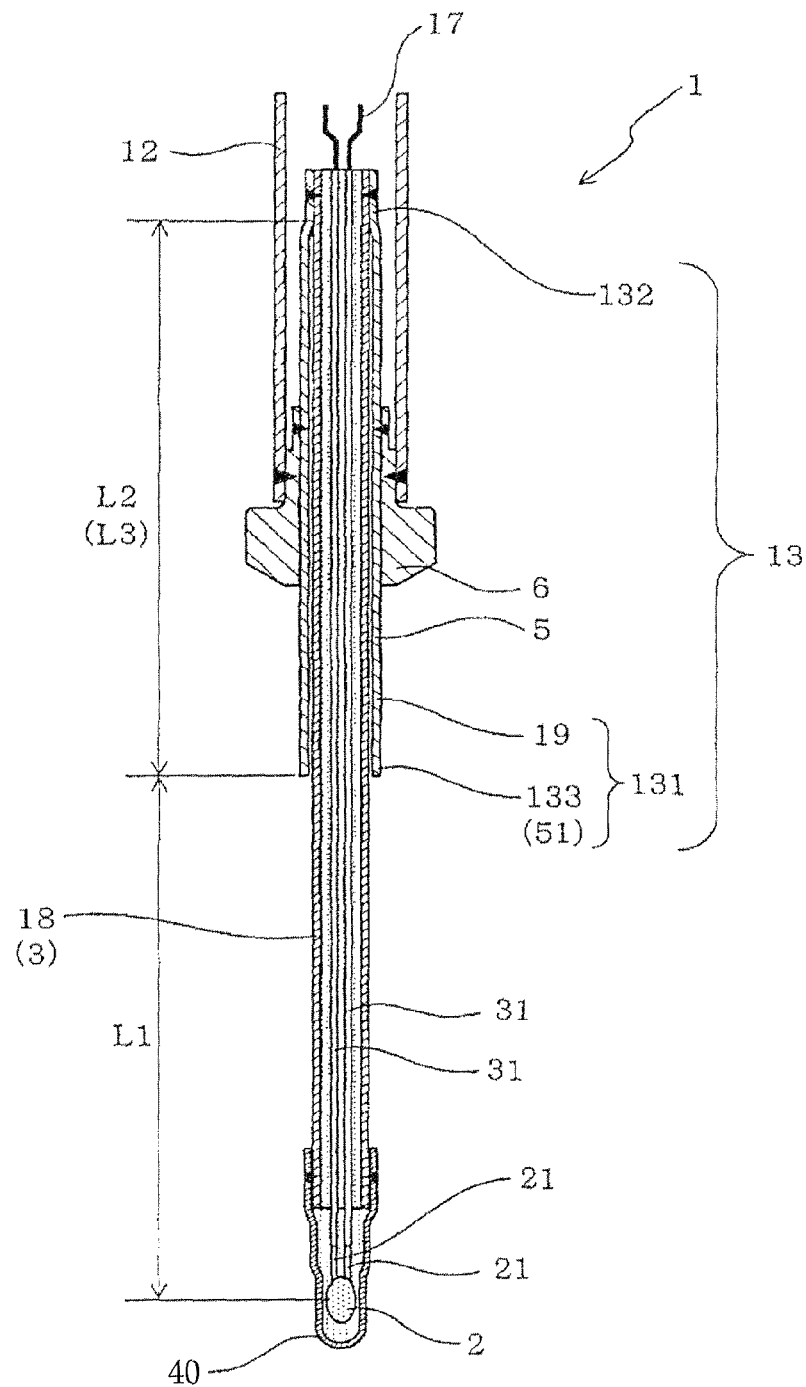
FIG. 14 is a longitudinal sectional view of a temperature sensor in the eleventh embodiment.
Figure 15:
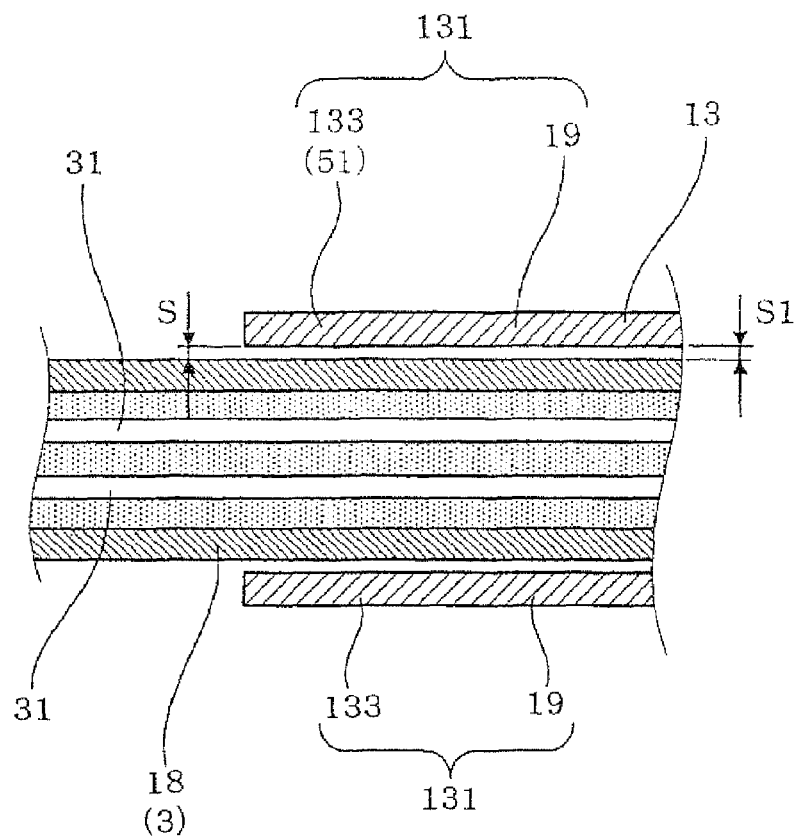
FIG. 15 is a longitudinal sectional view of a vicinity to a top end of an extendable portion in the eleventh embodiment.

This embodiment is, as illustrated in FIGS. 14 and 15, an embodiment in which the guard tube 5 does not have a small-diameter portion (see reference number 511 in FIG. 1).

Specifically, the size S of an air gap created between the front interference portion 133 is selected to agree with the size S1 of the clearance portion 19. For instance, the sizes S and S1 are 0.02 mm to 0.2 mm.

The axial length L2 between the tip of the extending portion 131 and the top end of the retainer portion 132 and the axial length L3 of the clearance portion 19 are selected to be equal to each other.

Other arrangements are identical with those in the first embodiment.

This embodiment eliminates the need for drawing the top end 51 of the guard tube 5, thus resulting in a decrease in number of production steps of the temperature sensor 1 leading to a decrease in production cost thereof.

In this embodiment, the top end 51 of the guard tube 5 functions as the front interference portion 133 to provide effects to suppress the vibration of the inner member 18.

The same operation and effects, as in the first embodiment, are achieved.

Embodiment 12

Figure 16:
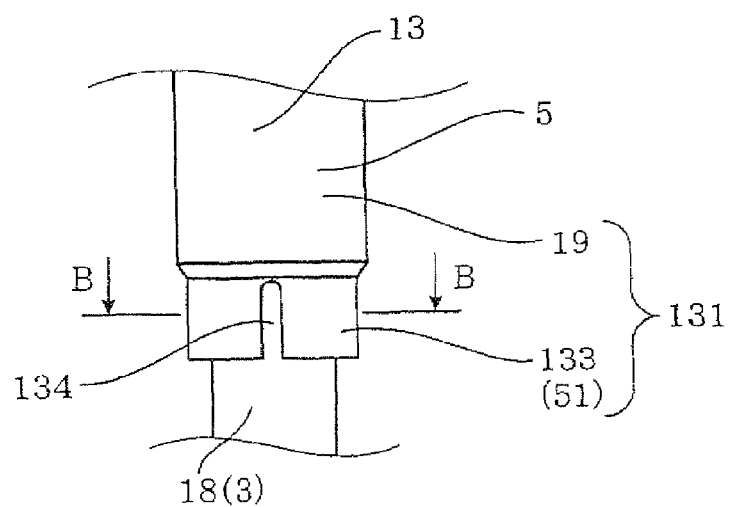
FIG. 16 is a side view of a vicinity to a top end interference portion in the twelfth embodiment.
Figure 17:
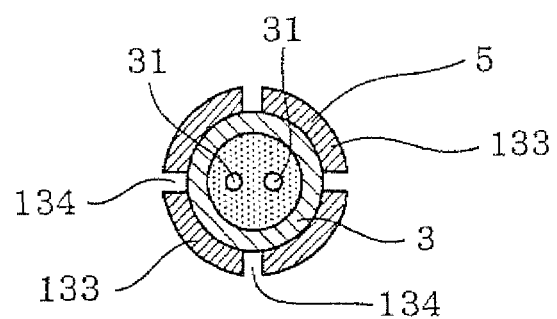
FIG. 17 is a B-B sectional view of FIG. 16 in the case of four slits in the twelfth embodiment.
Figure 18:
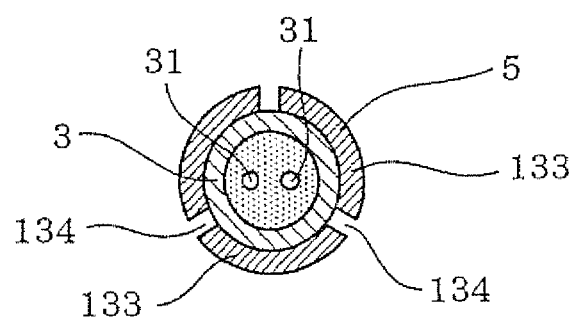
FIG. 18 is a B-B sectional view of FIG. 16 in the case where of three slits in the twelfth embodiment.

This embodiment is, as illustrated in FIGS. 16 to 18, an embodiment in which when the inner member 18 is in contact with the front interference portion 133, the front interference portion has the slits 134.

In this embodiment, the top end 51 of the guard pipe 5 has slits 134 formed therein to have discrete front interference portions 133 placed in contact with the sheath pin 3 that is the inner member 18.

The number of slits 134 may be, as illustrated in FIG. 17, four or, as illustrated in FIG. 18, three, and not limited to these.

Other arrangements are identical with those in the first embodiment.

In this embodiment, the inner member 18 is in contact with the front interference portion 133 to suppress the transmission of vibration from the outer member 13 to the inner member 18 through the front interference portion 133.

The same other operation and effects, as in the first embodiment, are achieved.

Embodiment 13

Figure 19:
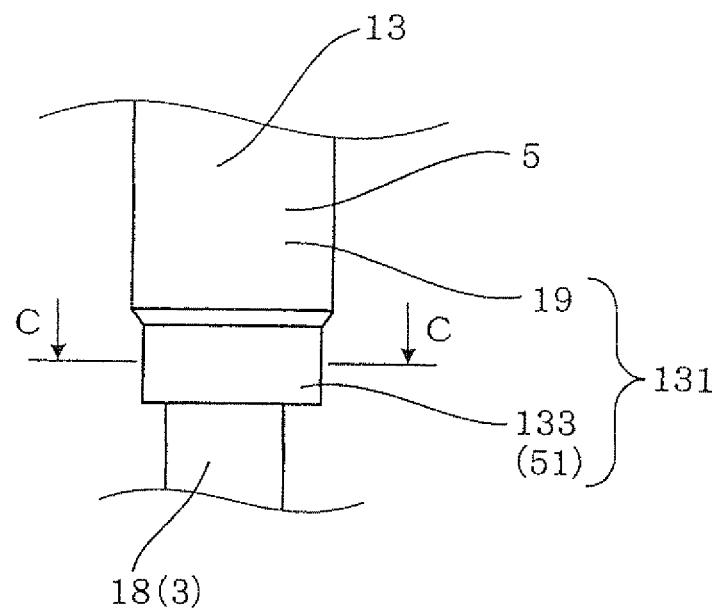
FIG. 19 is a side view of a vicinity to a top end interference portion in the third embodiment.
Figure 20:
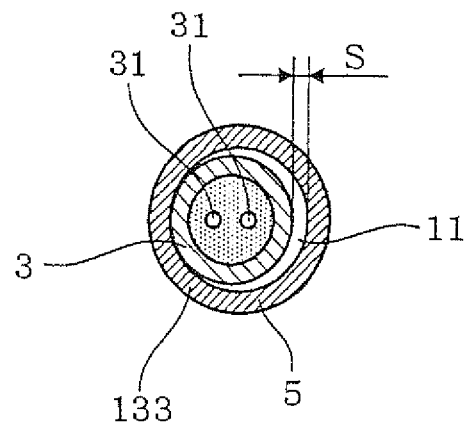
FIG. 20 is a sectional view, as taken along the line C-C in FIG. 19.

This embodiment is, as illustrated in FIGS. 19 and 20, an embodiment in which the inner shell 10 (i.e., the sheath pin 3) is disposed eccentrically with the outer member 13 (i.e., the guard tube 5).

In this case, the maximum size S2 of the air gap 11, as illustrated in FIG. 20, created between the inner member 18 (i.e., sheath pin 3) and the outer member 13 (i.e., the guard tube 5) at the front interference portion 133 is preferably 0.2 mm or less.

Other arrangements are identical with those in the first embodiment.

In this embodiment, the size S of the above air gap 11 which is 0.2 mm or less achieves the effects to suppress the vibration of the inner member 18 at the front interference portion 133.

The same other operation and effects, as in the first embodiment, are achieved.

Test Example 3

Figure 21:
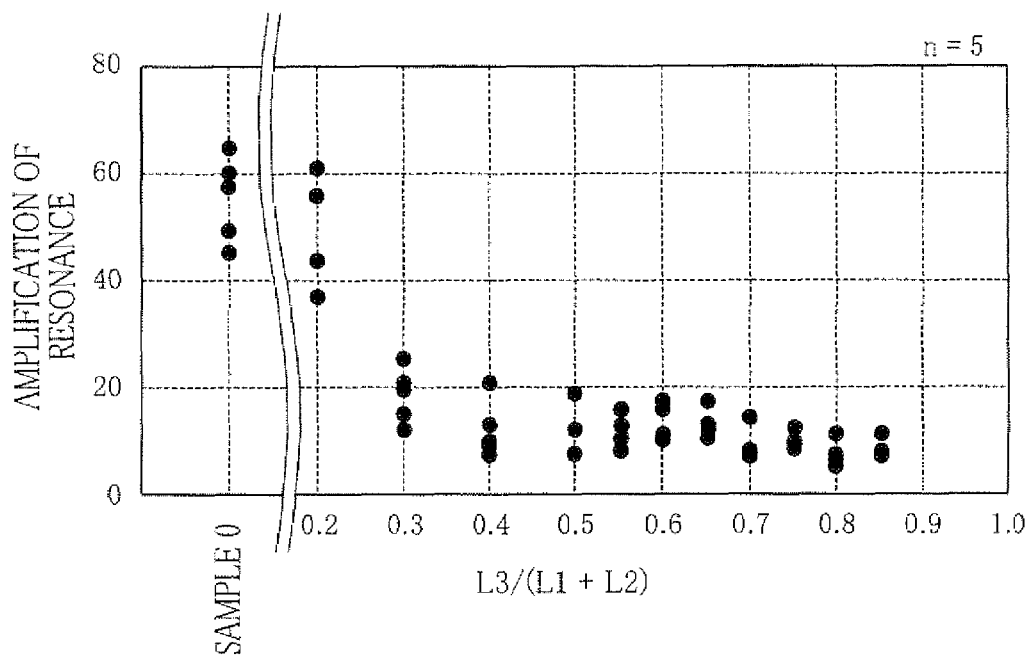
FIG. 21 is a diagrammatic view showing resonance control effects, as provided by the location where a top end interference portion is formed.
Figure 22:
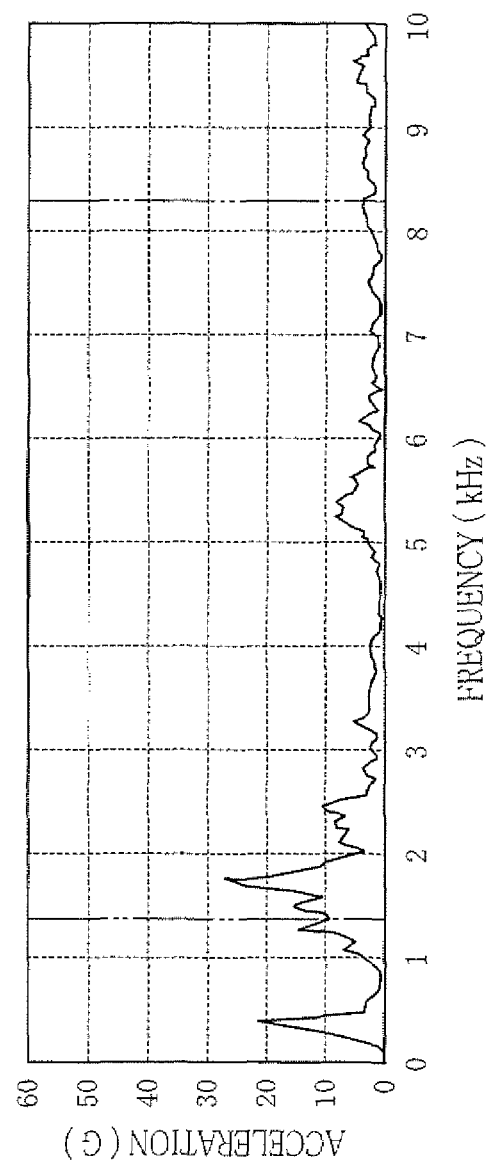
FIG. 22 is a diagrammatic view showing vibrational characteristics of a typical exhaust pipe in the fourth embodiment.

This example is, as illustrated in FIG. 21, an example in which the effects of suppressing the resonance of the inner member 18 (i.e., the sheath pin 3) depending upon the location where the front interference portion 133 is formed.

Specifically, as shown in FIG. 1, we changed the value of L3≥0.3×(L1+L2) where L1 is the axial length between the top end of the extending portion 131 and the center of the temperature sensitive device 2, L2 is the axial length between the top end of the retainer portion 132 and the top end of the extending portion 131, and L3 is the axial length of the clearance portion 19 and tested the amplification of the resonance of the sheath pin 3.

Figure 24:
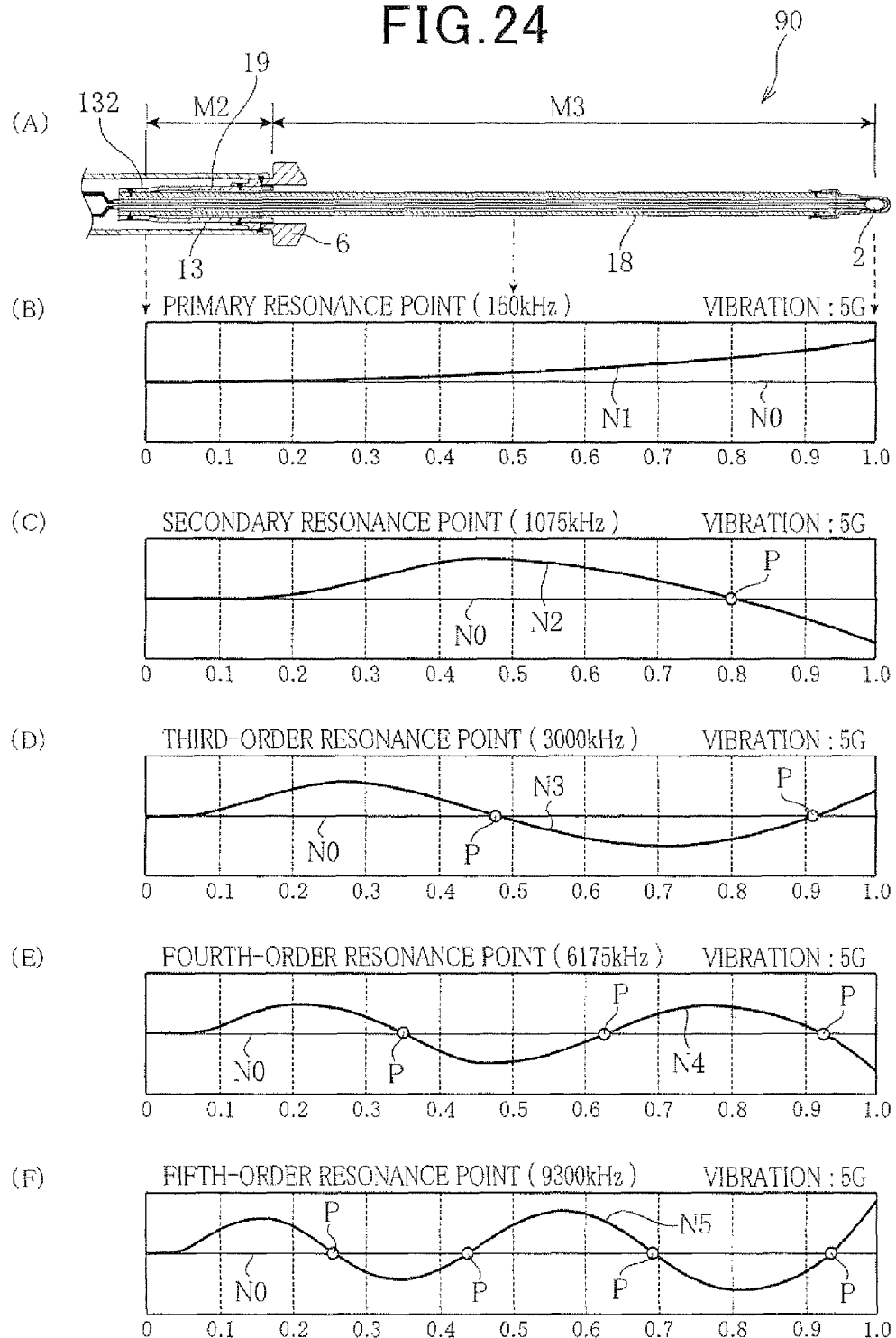
FIG. 24 is a diagrammatic view representing vibrational characteristics of an inside member at a primary resonance point to a fifth order resonance point.

We prepared temperature sensors 90, as illustrated in FIG. 24(A), as samples 0 which do not have a front interference portion. The temperature sensor 90 is basically identical in structure with the temperature sensor 1 of the first embodiment except for the shape of the outer member 13, but does not have the front interference portion 133 in the extending portion 131 of the outer member 13. The top end of the extending portion 131 is located closer to the rear end side than the top end of the rib 6. The clearance S1 between the clearance portion 19 and the inner member 18 at the extending portion 131 is 0.5 mm. The axial length M2 from the top end of the retainer portion 132 to the top end of the extending portion 131 is 19.2 mm. The axial length M3 from the top end of the extending portion 131 to the center of the temperature sensitive device 2 is 71.8 mm.

The basic structure is identical with that of the temperature sensor 1 of the first embodiment (FIG. 1). We prepared, as indicated in table 2, samples 1 to 11 in which the values of L1, L2, and L3 and are changed to change the value of L3/(L1+L2) between 0.2 to 0.85.

TABLE 2

| Sample No. | L3/(L1 + L2) | L1 (mm) | L2 (mm) | L3 (mm) |
|---|---|---|---|---|
| 1 | 0.2 | 71.8 | 19.2 | 18.2 |
| 2 | 0.3 | 62.7 | 28.3 | 27.3 |
| 3 | 0.4 | 53.6 | 37.4 | 36.4 |
| 4 | 0.5 | 44.5 | 46.5 | 45.5 |
| 5 | 0.55 | 39.95 | 51.05 | 50.05 |
| 6 | 0.6 | 35.4 | 55.6 | 54.6 |
| 7 | 0.65 | 30.85 | 60.15 | 59.15 |
| 8 | 0.7 | 26.3 | 64.7 | 63.7 |
| 9 | 0.75 | 21.75 | 69.25 | 68.25 |
| 10 | 0.8 | 17.2 | 73.8 | 72.8 |
| 11 | 0.85 | 12.65 | 78.35 | 77.35 |

However, in each of the samples, the length L0 between the top end of the outer peripheral surface 611 of the contacting portion 61 of the rib 6 and the tip of the temperature sensor 1 (see FIG. 6) is 80 mm. The size S of the air gap between the front interference portion 133 and the sheath pin 3 (see FIG. 4) is 0.2 mm. The clearance S1 at the clearance portion 19 (see FIG. 4) is 0.5 mm.

We used the samples to investigate the effects of a change in value of L3/(L1+L2) on the amplification of the resonance at the primary resonance point of the sheath pin 3.

In this test, we used a vibrator similar to that used in the test example 1 to vibrate the temperature sensors at a frequency on the primary resonance point at an acceleration of 5 G. We performed the resonance tests on each of the samples five times.

The amplification of the resonance is the value derived by dividing the acceleration on the top end of the inner member 18 by the acceleration of the vibrator.

Results of the tests are shown in FIG. 21. In the drawing, left plots indicate data on the samples 0. Data on the samples 1 to 11 are plotted on values of L3/(L1+L2) on the horizontal axis.

FIG. 21 shows that when L3/(L1+L2)≥0.3, that is, L3≥0.3× (L1+L2), the amplification of the resonance is reduced greatly.

It is also found that when L3<0.3×(L1+L2), the same amplification of the resonance as in the samples 0 (i.e., when there is no front interference portion 133) is derived, so that desired effects of the front interference portion 133 are not obtained.

This is because the near the top end of the temperature sensor, the greater the amplitude of the inner member 18 (i.e., the sheath pin 3), so that the greater L3/(L1+L2), the easier the interference of the front interference portion 133 with the inner member 18 (i.e., the sheath pin 3), thereby facilitating the suppression of the resonance. It would appear that the effects of suppressing the resonance becomes pronounced when L3/(L1+L2) is greater than or equal to 0.3.

The test results show an example of a long sensor (L0=80 mm) which is very affected by the vibration, but however, the same effects have been found to be obtained regardless of L0.

Embodiment 14

In this embodiment, we studied, as illustrated in FIGS. 22 to 27, the significance of placing the front interference portion 133 at a location other than a node of vibration of the inner member 18 at a frequency less than or equal to 10 kHz and found the effects.

Generally, vibrations of a portion of the temperature sensor installed in an exhaust pipe of a vehicle has the peak within a low frequency band (less than or equal to 2 kHz). In contrast, typical temperature sensors (e.g., L0=40 mm) have the primary resonance point between 1 to 2 kHz which is identical with the resonance band of the exhaust pipe, which may result in an increase in vibration of the temperature sensors, so that excessive stress acts thereon.

Therefore, there is an object of reducing the above primary resonance. The primary resonance may be reduced by the structure, as described in the first to fifteenth embodiments.

In other words, in the case where the typical temperature sensor is installed in typical vehicles, there is no need for considering the vibration in a high frequency band. It is, thus, unnecessary to consider the location of the front interference portion 133 relative to the inner member 18.

Figure 23:
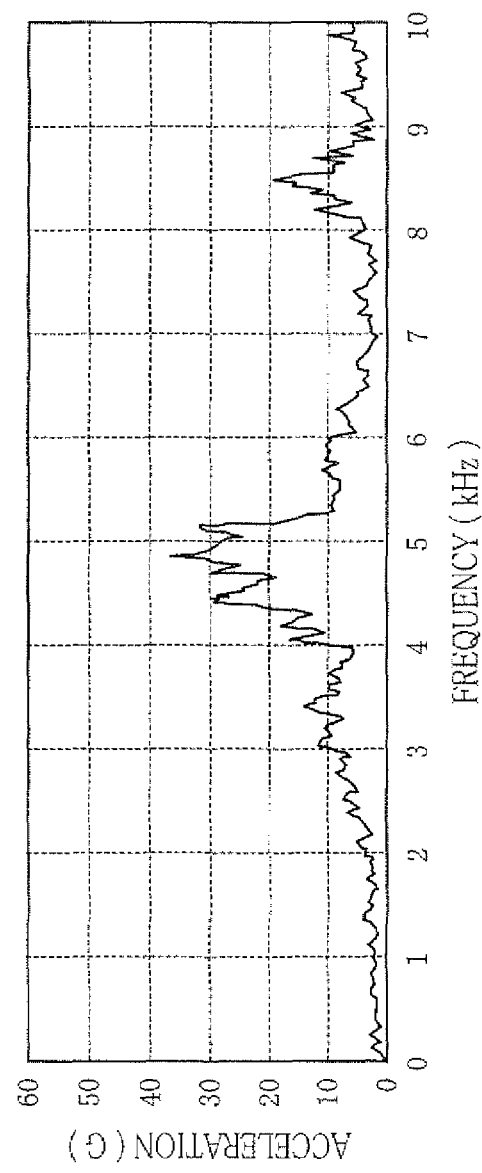
FIG. 23 is a diagrammatic view showing vibrational characteristics of an exhaust pipe which is expanded until a resonance range is a high-frequency range.

However, vehicles that are small in engine displacement and equipped with a supercharger have been increased with recent trends of fuel regulations. The vibration of a portion of the exhaust pipe to which the temperature sensor is attached is, therefore, changed greatly in actual environments. In other words, a vibration level is not only increased, but an actual resonance band is, as illustrated in FIG. 23, increased to a high frequency band (e.g., 10 kHz).

For the above reasons, it is, therefore, advisable that the secondary resonance of the temperature sensor be suppressed as well as the primary resonance. In other words, it has been found that it is preferable to suppress all resonances within 10 kHz.

We have devoted ourselves to solving of the above problem and found that it is advisable that the front interference portion 133 be placed at a location other than a node of vibration of the inner member 18 within a frequency band up to 10 kHz.

The reasons for the above will be described below.

Figure 25:
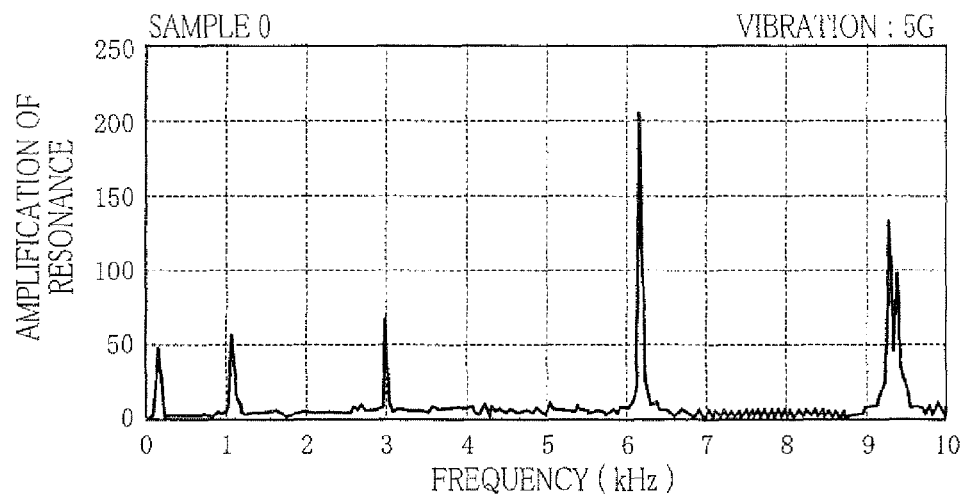
FIG. 25 is a diagrammatic view showing vibrational characteristics of a sample 0 in the fourth embodiment.

We used the samples 0 (FIG. 24(A)), as employed in the above test example 3, which do not have the front interference portion and measured vibration characteristics of the inner member 18. We measured, as illustrated in FIG. 25, resonance points of the inner member 18 up to 10 kHz using a laser Doppler measuring instrument and found that there are up to the fifth order resonance point in a band of up to 10 kHz. The addition of vibration to the temperature sensors were made in the same condition as in the test example 3.

Next, we measured maximum amplitudes at measurement locations, as indicated in FIGS. 24(B) to 24(F), when the vibration was added at the resonance points and found that the inner member 18 was in a vibration mode in which the retainer portion 132 is a fixed end.

In each of the figures, a straight line N0 is a horizontal axis on which the amplitude is zero (0). Curved lines N1 to N5 indicate maximum amplitudes of respective portions of the inner member 18. Intersections P of the curved lines N1 to N5 and the straight line N0 indicate nodes of the inner member 18.

Scales (0 to 1.0) on the horizontal liens in FIGS. 24(B) to 24(F) indicates distances of the respective portions of the inner member 18 from the top end of the retainer portion 132 when an axial distance (M2+M3) between the top end of the retainer portion 132 of the temperature sensor, as illustrated in FIG. 24(A), and the center of the temperature sensitive device 2 is 1.0.

We thought that the front interference portion 133 may be placed at a location other than the nodes (symbol P), i.e., at antinodes of vibration of the inner member 18 to suppress the resonance of the inner member 18 and verified it.

Figure 26:
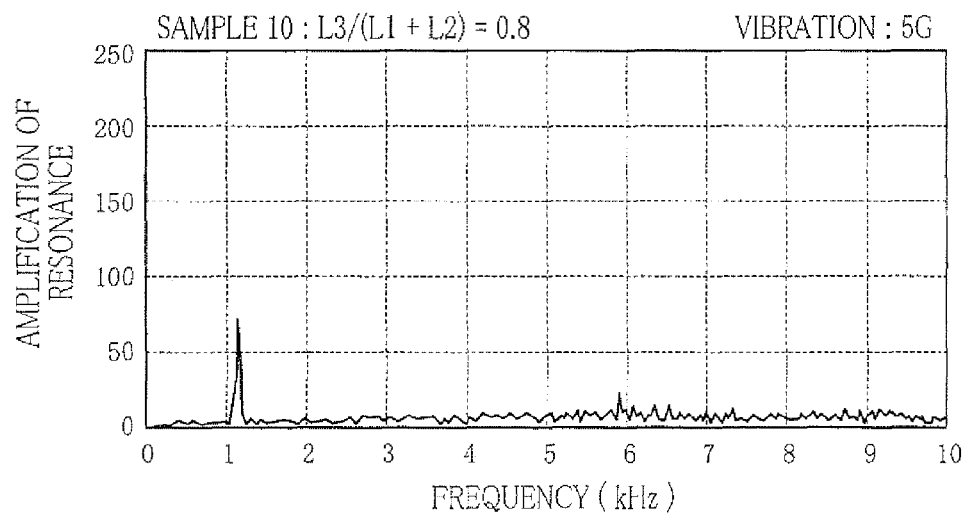
FIG. 26 is a diagrammatic view showing vibrational characteristics of a sample 10 in the fourth embodiment.
Figure 27:
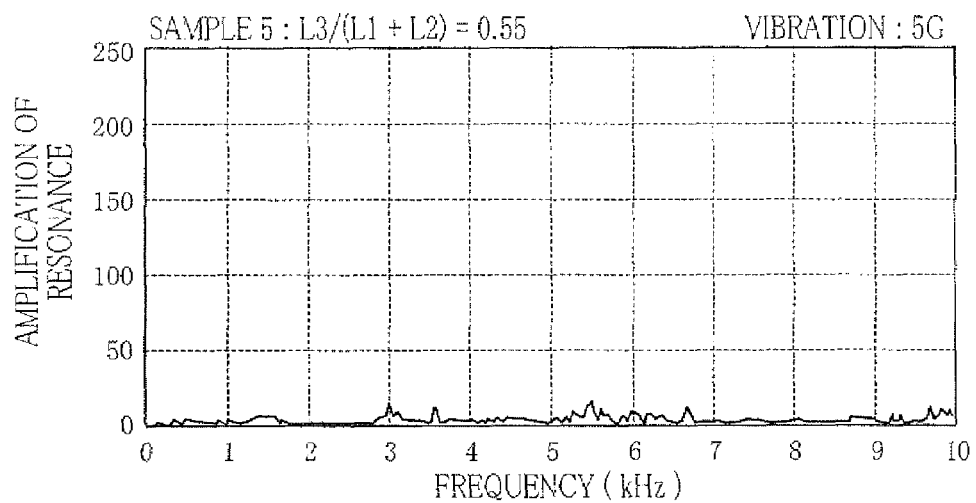
FIG. 27 is a diagrammatic view showing vibrational characteristics of a sample 5 in the fourth embodiment.

An example of results of the verification made by using the samples, as indicated in table 1 used in the test example 3, are shown in FIGS. 25 to 27. FIG. 25 shows results of the samples 0 which are listed in table 1, as used in the test example 3 in which the front interference portion 133 is not provided, and which have the primary to fifth order resonance points, as already described, within a range of up to 10 kHz, and represents great amplifications of the resonance in response to the addition of vibration at the resonance points.

FIG. 26 shows results of the verification of the samples in which the front interference portion 133 is placed at a location of the same L3/(L1+L2) as in the samples 10 in table 1 used in the test example 3, and the size S of the air gap between the front interference portion 133 and the inner member 18 is changed to 0.08 mm. The samples 10 are temperature sensors in which the front interference portion 133 is placed at a location of L3/(L1+L2)=0.8, that is, at the node of the secondary resonance (see symbol P in FIG. 24(C)).

It is found from FIG. 26 that in the samples 10, the resonances other than the secondary resonance are suppressed. This is because the front interference portion 133 is thought of as being formed at the location away from the node of other than the secondary resonance of the inner member 18 (see symbols P in FIGS. 24(B), 24(D), 24(E) and 24(F)).

FIG. 27 shows results of the verification of the samples in which the front interference portion 133 is placed at a location of the same L3/(L1+L2) as in the samples 5 in table 1 used in the test example 3, and the size S of the air gap between the front interference portion 133 and the inner member 18 is changed to 0.08 mm. The samples 5 are temperature sensors in which the front interference portion 133 is placed at a location of L3/(L1+L2)=0.55 that is, other than the nodes of all the primary to fifth order resonances (see symbol P in FIG. 24(B) to 24(F)).

It is found from FIG. 27 that in the samples 5, all the resonances are suppressed.

The above results have offered new information that any vibration as well as a high order of vibration may be suppressed greatly by placing the front interference portion 133 at a location other than the nodes of vibration of the inner member 18 even in the long sensors which are very affected by the vibration.

Test Example 4

We used samples in which it is placed at a location of the same L3/(L1+L2) as in the samples 5 in table 2 used in the test example 3, and the size S of the air gap between the front interference portion 133 and the inner member 18 is changed to various values and measured amplifications of resonance in terms of the values of the size S of the air gap 11 between the front interference portion 133 and the sheath pin 3.

The sizes S of the air gap in the samples are indicated in table 3.

TABLE 3

| Sample No. | Air Gap S (mm) | L3/(L1 + L2) |
| --- | --- | --- |
| 1 | 0 | 0.55 |
| 2 | 0.02 | 0.55 |
| 3 | 0.04 | 0.55 |
| 4 | 0.06 | 0.55 |
| 5 | 0.08 | 0.55 |
| 6 | 0.1 | 0.55 |
| 7 | 0.12 | 0.55 |

In this test, we used a vibrator similar to that used in the test example 1 to sweep the temperature sensors at 50 Hz to 10 kHz at an acceleration of 5 G and measured a maximum amplification of the resonance five times for each of the samples. We plotted the measured values in FIG. 28.

Figure 28:
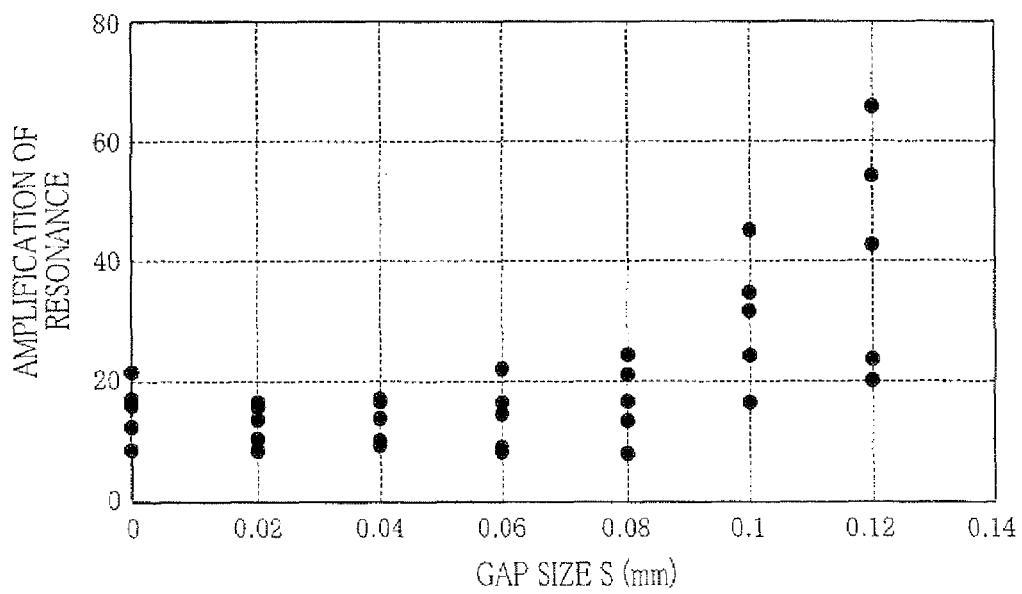
FIG. 28 is a diagrammatic view showing resonance control effects of an inner member, as provided by the location where a top end interference portion is formed in an experimental example 4.

It is found from the results in FIG. 28 that when the size S of the air gap 11 is less than or equal to 0.08 mm, and the amplification of the resonance is low, when the size S of the air gap 11 exceeds 0.08 mm, the amplification of the resonance becomes great. This means that the size S of the air gap 11 may be set to 0.2 mm or less, as indicated in the test example 2, to suppress the primary vibration and may also be set to 0.08 mm or less to suppress a high order of vibration such as the secondary or third order vibration.

Embodiment 15

This embodiment is, as illustrated in FIG. 29(A), an embodiment in which the front interference portions 133 are formed on the extending portion 131 at locations separate in the axial direction.

Specifically, the front interference portion 133 is also formed behind the top end (i.e., the top end 51 of the guard tube 5) of the extending portion 131 as well as that on the top end.

Other arrangements are identical with those in the first embodiment.

This embodiment also has the same operation and effects as those in the first embodiment.

Embodiment 16

This embodiment is, as illustrated in FIG. 29(B), an embodiment in which the front interference portion 133 is not provided on the top end of the extending portion 131 (the top end 51 of the guard tube 5), but formed on the side closer to the base end side than the top end.

Other arrangements are identical with those in the first embodiment.

This embodiment also has the same operation and effects as those in the first embodiment.

As indicated in the fifteenth and sixteenth embodiments, as long as the front interference portion 133 is closer to the top end side than the retainer portion 132, it may be formed in any portion of the extending portion 131. The front interference portion(s) 133 may also be formed at a single or a plurality of locations.

What is claimed is:

1. A temperature sensor equipped with a temperature sensitive device to be disposed inside an exhaust pipe of an internal combustion engine, signal lines connected at a top end side to the temperature sensitive device and at a rear end side to leads for connection with an external circuit, an inner member having a sheath pin in which the signal lines are disposed, and an outer member disposed to cover at least a portion of an outer periphery of the inner member, characterized in that said outer member includes a fixed portion to be fixed to an upper wall of the exhaust pipe, a retainer portion retaining said inner member, and an extending portion formed closer to a top end side than the retainer portion, and the extending portion includes a clearance portion disposed so as to have an air gap between itself and said inner member and a front interference portion disposed in a condition that a maximum air gap between the front interference portion and the inner member in a radius direction is 0.2 mm or less, wherein a free end of a top end portion of the extending portion is movable relative to the inner member in order to absorb shock caused by vibration of the inner member.

2. A temperature sensor as set forth in claim 1, characterized in that said fixed portion is made of a rib disposed on an outer periphery of said sheath pin.

3. A temperature sensor as set forth in claim 1, characterized in that an axial length L1 between a top end of the extending portion and a center of said temperature sensitive device, an axial length L2 between a top end of the retainer portion and the top end of the extending portion, and an axial length L3 of the clearance portion meet a relation of L3≥0.3 X(L1+L2).

4. A temperature sensor as set forth in claim 1, characterized in that said front interference portion is so disposed that the maximum air gap between itself and the inner member in the radius direction is 0.08 mm or less.

5. A temperature sensor as set forth in claim 1, characterized in that said front interference portion is placed at a location other than a node of vibration of said inner member within a frequency band of 10 kHz or less.

6. A temperature sensor as set forth in claim 1, characterized in that the outer member includes a guard tube disposed so as to cover the outer periphery of said inner member, and said extending portion is made of a part of the guard tube.

7. A temperature sensor as set forth in claim 6, wherein said inner member is retained by said fixed portion through the guard tube.

8. A temperature sensor as set forth in claim 7, wherein the guard tube has small-diameter portions which are formed at a top end and a rear end and are smaller in diameter than another portion thereof.

9. A temperature sensor as set forth in claim 6, characterized in that said guard tube and said fixed portion are welded at entire circumferences thereof.

10. A temperature sensor as set forth in claim 1, characterized in that said retainer portion is formed at an axial location coinciding with a rear end portion of said fixed portion or closer to the rear end side than the rear end portion of said fixed portion.

11. A temperature sensor as set forth in claim 1, characterized in that a rear end portion of said outer member and said inner member are welded at entire circumferences thereof at said retainer portion.

12. A temperature sensor as set forth in claim 1, characterized in that said temperature sensor has a metal cover formed so as to cover said temperature sensitive device.

13. A temperature sensor as set forth in claim 12, characterized in that a retaining member is disposed between said temperature sensitive device and said metal cover to retain and fix said temperature sensitive device.

14. A temperature sensor as set forth in claim 1, characterized in that said temperature sensor includes a metal tube formed so as to cover the outer periphery of said sheath pin and said temperature sensitive device, the metal tube being disposed between the sheath pin and said fixed portion.

15. A temperature sensor as set forth in claim 14, characterized in that a retaining member is disposed between said temperature sensitive device and said metal tube to retain and fix said temperature sensitive device.

16. A temperature sensor as set forth in claim 1, characterized in that said temperature sensitive device is made of a thermistor.

17. A temperature sensor as set forth in claim 1, characterized in that at least a portion of said inner member and said outer member is made of an oxidation resistance metallic material.

18. A temperature sensor as set forth in claim 1, characterized in that said temperature sensitive device is sealed by glass sealing material.

19. A temperature sensor as set forth in claim 1, characterized in that said front interference portion has a parallel portion parallel to an outer peripheral surface of said inner member.

20. A temperature sensor as set forth in claim 1, characterized in that said front interference portion has a portion contacting with an outer peripheral surface of said inner member.

21. A temperature sensor as set forth in claim 1, wherein the top end portion of the extending portion is not fixedly coupled to the inner member.

* * * * *